US010802889B1

(12) United States Patent
Ganesan et al.

(10) Patent No.: US 10,802,889 B1
(45) Date of Patent: Oct. 13, 2020

(54) SYSTEMS AND METHODS OF VIRTUAL RESOURCE MONITORING FOR ROBOTIC PROCESSES

(71) Applicant: NTT DATA Services, LLC, Plano, TX (US)

(72) Inventors: Dhurai Ganesan, Chennai (IN); Sankar Chandrasekaran, Chennai (IN); Harsh Vinayak, Gurgaon (IN); Tanvir Khan, Allen, TX (US)

(73) Assignee: NTT DATA Services, LLC, Plano, TX (US)

( * ) Notice: Subject to any disclaimer, the term of this patent is extended or adjusted under 35 U.S.C. 154(b) by 173 days.

(21) Appl. No.: 16/038,880

(22) Filed: Jul. 18, 2018

(51) Int. Cl.
*G06F 9/455* (2018.01)
*G06F 9/50* (2006.01)

(52) U.S. Cl.
CPC .......... *G06F 9/5077* (2013.01); *G06F 9/5005* (2013.01)

(58) Field of Classification Search
None
See application file for complete search history.

(56) References Cited

U.S. PATENT DOCUMENTS

| 6,292,715 | B1 | 9/2001 | Rongo |
| 8,346,391 | B1 | 1/2013 | Anhalt et al. |
| 2011/0153079 | A1 | 6/2011 | Jung et al. |
| 2017/0001308 | A1 | 1/2017 | Bataller et al. |
| 2017/0052824 | A1 | 2/2017 | Sharma et al. |
| 2017/0173784 | A1 | 6/2017 | Shah et al. |
| 2017/0228119 | A1 | 8/2017 | Hosbettu et al. |
| 2017/0249283 | A1* | 8/2017 | Gupta ..................... G06F 9/542 |
| 2017/0352041 | A1 | 12/2017 | Ramamurthy et al. |
| 2019/0102676 | A1* | 4/2019 | Nazari ................... G06N 20/00 |
| 2019/0126463 | A1* | 5/2019 | Purushothaman ..... G06Q 10/04 |
| 2019/0129824 | A1* | 5/2019 | Radhakrishnan ... G06F 11/0766 |
| 2019/0141596 | A1* | 5/2019 | Gay ...................... H04W 36/18 |
| 2019/0303779 | A1* | 10/2019 | Van Briggle ....... G06F 11/1438 |

(Continued)

OTHER PUBLICATIONS

Zheng et al., "IAPcloud: A Cloud Control Platform for Heterogeneous Robots", May 17, 2018, IEEE Access, vol. 6, pp. 30577-30591. (Year: 2018).*

(Continued)

*Primary Examiner* — Kenneth Tang
(74) *Attorney, Agent, or Firm* — Shackelford, Bowen, McKinley & Norton, LLP

(57) ABSTRACT

In one embodiment, a method includes monitoring, in real-time, a plurality of resources including a first robotic process resident on a first RPA platform and a second robotic process resident on a second RPA platform. The first RPA platform and the second RPA platform provide robotic process data in heterogeneous data formats via heterogeneous interfaces. The method also includes, responsive to a trigger, invoking at least one function on a unified interface. The method also includes receiving at least one function call reply from the unified interface responsive to the invoking, the at least one function call reply including homogeneous data related to the first robotic process and the second robotic process. In addition, the method includes determining real-time statuses of the first robotic process and the second robotic process using the homogeneous data. The method also includes updating a real-time dashboard with the real-time statuses.

18 Claims, 9 Drawing Sheets

(56) References Cited

U.S. PATENT DOCUMENTS

2020/0004798 A1* 1/2020 Weinert, Jr. .......... G06F 16/953
2020/0047334 A1* 2/2020 Mummigatti .......... G06F 9/542

OTHER PUBLICATIONS

AppliedAI.com, "Robotic Process Automation Comprehensive Guide," Dec. 11, 2017, pp. 1-16.
Lacity, M. C., et al., "A New Approach to Automating Services," MIT Sloan Management Review, Fall 2016, vol. 58, No. 1, pp. 40-49.
Blue Prism Robotic Process Automation Software, "npower Business Solutions Case Study," URL: <https://www.blueprism.com/cstudies/npower-expands-digital-workforce-330-blue-prism-software-robots>, Retrieved: May 7, 2018, pp. 1-9.
Le Clair, C., "The Forrester Wave: Robotic Process Automation, Q1 2017, The 12 Providers That Matter Most and How They Stack Up," Forrester Research, Inc., Feb. 13, 2017, pp. 1-17.

\* cited by examiner

SYSTEMS AND METHODS OF VIRTUAL RESOURCE MONITORING FOR ROBOTIC PROCESSES

BACKGROUND

Technical Field

The present disclosure relates generally to robotic processes and more particularly, but not by way of limitation, to systems and methods for virtual resource monitoring for robotic processes.

HISTORY OF RELATED ART

Robotic process automation (RPA) is the use of software with artificial intelligence (AI) and machine learning capabilities to handle high-volume, repeatable, tasks that previously required humans to perform. These tasks can include queries, calculations, and maintenance of records and transactions. RPA technology can mimic a human worker by, for example, logging into applications, entering data, calculating and completing tasks, and logging out. RPA technology is not always part of an organization's information technology (IT) infrastructure, but can instead, sit on top of it, enabling an organization to implement RPA technology quickly and efficiently, without changing the existing infrastructure and systems.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment, a method is performed by a resource monitoring system. The method includes monitoring, in real-time, a plurality of resources including a first robotic process resident on a first RPA platform and a second robotic process resident on a second RPA platform. The first RPA platform and the second RPA platform provide robotic process data in heterogeneous data formats via heterogeneous interfaces. The method further includes receiving a trigger responsive to the monitoring. The method also includes, responsive to the trigger, invoking at least one function on a unified interface, where the unified interface establishes a gateway to the first RPA platform and the second RPA platform and communicates with the heterogeneous interfaces of the first RPA platform and the second RPA platform in execution of the at least one function, and where the unified interface homogenizes the heterogeneous data formats. The method also includes receiving at least one function call reply from the unified interface responsive to the invoking, the at least one function call reply including homogeneous data related to the first robotic process and the second robotic process. In addition, the method includes determining real-time statuses of the first robotic process and the second robotic process using the homogeneous data related to the first robotic process and the second robotic process. The method also includes updating a real-time dashboard with the real-time statuses of the first robotic process and the second robotic process.

In one embodiment, a system includes a processor and memory, where the processor and memory in combination are operable to implement a method. The method includes monitoring, in real-time, a plurality of resources including a first robotic process resident on a first RPA platform and a second robotic process resident on a second RPA platform. The first RPA platform and the second RPA platform provide robotic process data in heterogeneous data formats via heterogeneous interfaces. The method further includes receiving a trigger responsive to the monitoring. The method also includes, responsive to the trigger, invoking at least one function on a unified interface, where the unified interface establishes a gateway to the first RPA platform and the second RPA platform and communicates with the heterogeneous interfaces of the first RPA platform and the second RPA platform in execution of the at least one function, and where the unified interface homogenizes the heterogeneous data formats. The method also includes receiving at least one function call reply from the unified interface responsive to the invoking, the at least one function call reply including homogeneous data related to the first robotic process and the second robotic process. In addition, the method includes determining real-time statuses of the first robotic process and the second robotic process using the homogeneous data related to the first robotic process and the second robotic process. The method also includes updating a real-time dashboard with the real-time statuses of the first robotic process and the second robotic process.

In one embodiment, a computer-program product includes a non-transitory computer-usable medium having computer-readable program code embodied therein, the computer-readable program code adapted to be executed to implement a method. The method includes monitoring, in real-time, a plurality of resources including a first robotic process resident on a first RPA platform and a second robotic process resident on a second RPA platform. The first RPA platform and the second RPA platform provide robotic process data in heterogeneous data formats via heterogeneous interfaces. The method further includes receiving a trigger responsive to the monitoring. The method also includes, responsive to the trigger, invoking at least one function on a unified interface, where the unified interface establishes a gateway to the first RPA platform and the second RPA platform and communicates with the heterogeneous interfaces of the first RPA platform and the second RPA platform in execution of the at least one function, and where the unified interface homogenizes the heterogeneous data formats. The method also includes receiving at least one function call reply from the unified interface responsive to the invoking, the at least one function call reply including homogeneous data related to the first robotic process and the second robotic process. In addition, the method includes determining real-time statuses of the first robotic process and the second robotic process using the homogeneous data related to the first robotic process and the second robotic process. The method also includes updating a real-time dashboard with the real-time statuses of the first robotic process and the second robotic process.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
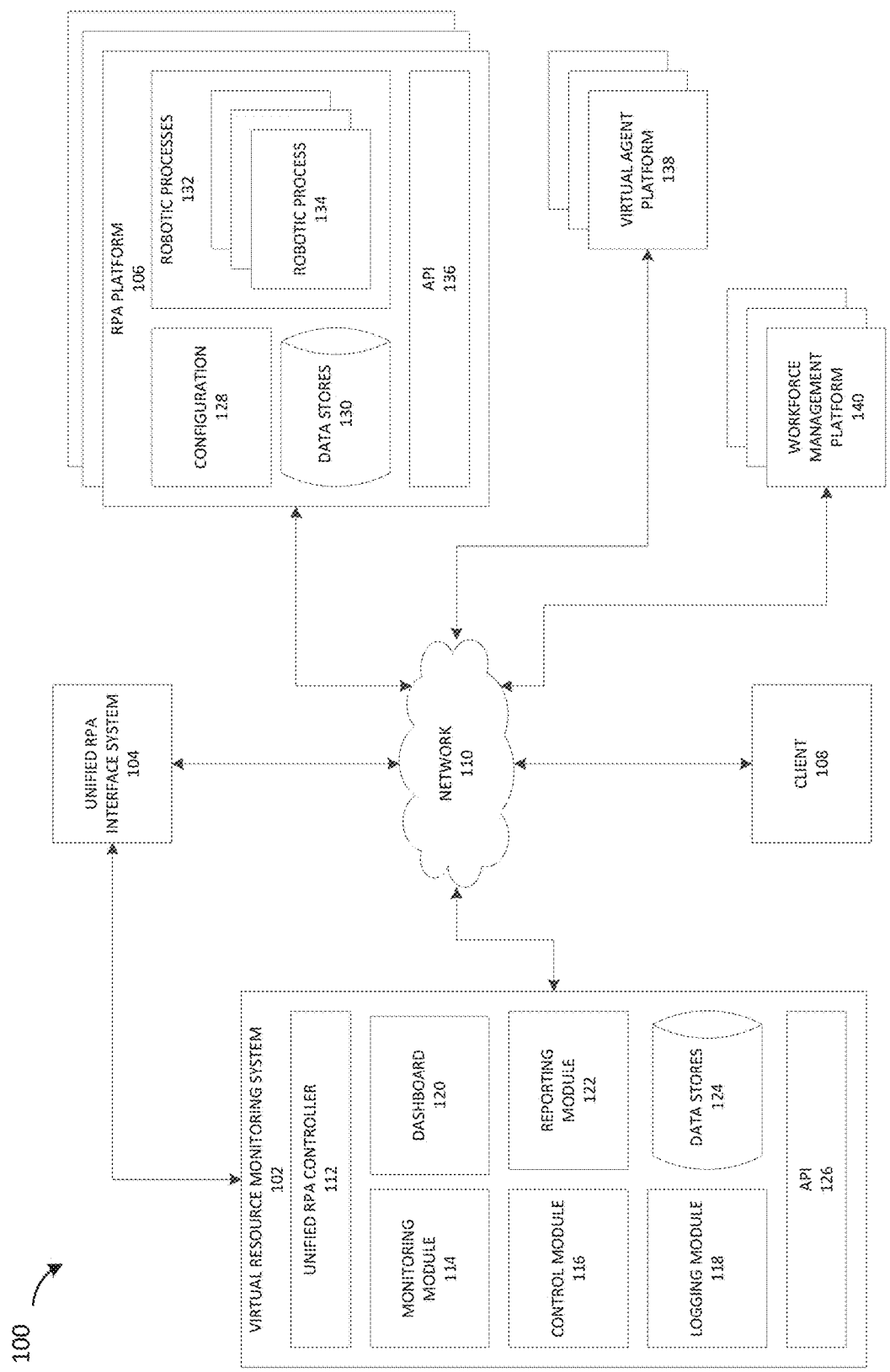
FIG. 1 illustrates an example of a virtual resource management system.

With the emergence of robotic process automation (RPA) technologies, robotic processes are being used in organizations to support various business functions and processes. While management and operation teams may have access to an in-house or off-the-shelf business process management suite to allocate tasks and monitor the performance of the human workforce, they usually lack the ability to measure the efficiency of the robotic processes and oversee the entire automation cycle.

In some cases. RPA platforms for robotic processes can be inbuilt with a tool to monitor the activity and performance of each robotic process. However, such tools often have limitations in monitoring heterogeneous robotic processes (i.e., those built and deployed through differing RPA platforms). Thus, if an organization uses robotic processes built using multiple RPA platforms, they need to introduce the technical complexity of multiple monitoring tools, which tools generally provide inconsistent, heterogeneous data formats regarding diverse robotic processes and generally fail to provide any consolidated data on overall operation performance across diverse RPA platforms.

Oftentimes the RPA platforms have no uniform way of communication. For example, many RPA platforms require specific platform instructions via heterogeneous interfaces to operate robotic processes and obtain robotic process data related to the robotic processes. Thus, with multiple platforms, organizations are forced to utilize a multitude of various tools in order to operate, maintain, and gather information on the organization's robotic processes. This particular problem becomes more exacerbated as more and more RPA platforms are being utilized for specialized tasks. Organizations can have, for example, a particular RPA platform for a particular set of robotic processes, for example, to process complex algorithms and a separate RPA platform for a separate set of robotic process, for example, to process less complex algorithms. Various embodiments described herein can eliminate the gap built between the multiple, and frequently distinct, RPA platforms by unifying data from the RPA platforms into a single platform.

Moreover, as organizations become more advanced in their robotic process needs, an organization may need to implement custom built robotic processes on custom built RPA platforms. When organizations begin developing in-house robotic processes, the need increases for a unified front-end to operate robotic processes, ranging from specialty RPA platforms to custom-built RPA platforms. Furthermore, as technology advances, organizations will need to utilize legacy robotic processes on legacy RPA platforms with current robotic processes on current RPA platforms. Various embodiments described herein can fill this void by having, for example, adapters that are operable to interact with a plurality of RPA platforms such as, for example, current RPA platforms, custom-built RPA platforms, and legacy RPA platforms. In various embodiments, robotic processes across a variety of RPA platforms, and corresponding heterogeneous interfaces across the variety of RPA platforms, can be unified, thereby creating a unified interface irrespective of the RPA platform. Furthermore, the unified interface can homogenize disparate, or heterogeneous, data formats in which data is provided by the variety of RPA platforms, thereby providing data in a standardized format.

Various embodiments described herein can overcome the above-mentioned challenges and obsolete the need to alternate between multiple monitoring tools, or RPA platforms, to monitor the effectiveness and efficiency of a heterogeneous plurality of robotic processes on a heterogeneous plurality of RPA platforms. The present disclosure describes examples of solutions that can incorporate robotic process management that can belong to the same or different RPA platform, can have similar or unique development and/or deployment environments, and can integrate robotic processes that may have been created either using a third-party RPA platform or an RPA platform that was custom built in-house. More particularly, the present disclosure describes examples of a virtual resource monitoring system that provides the flexibility to integrate with various RPA platforms.

Integrating robotic processes from various RPA platforms is a technically-challenging task that is prone to risks of misconfiguration and typically requires additional, and substantial, technological infrastructure to gain insight into each RPA platform. Moreover, robotic processes from each RPA platform have distinct deployment models and come with diverse management systems. Change management and governance of robotic processes from multiple RPA platforms often requires additional development effort every time new deployments of RPA platforms or robotic processes are made.

RPA technology can be leveraged to standardize and optimize a number of varying processes using robotic processes, programmed to perform repeatable or rules-based tasks, in business processes. These robotic processes range from simple, manual workarounds, to complex software that may run on virtual machines. Dynamic, trigger-based, processes using existing workflow tools in an organization may also benefit from RPA technology, and RPA platforms can facilitate the implementation of robotic process automation for these processes within an organization. While there are gains in productivity through RPA technology, the real challenge lies in efficient monitoring of the effectiveness of robotic process automation initiatives and defining automation-related savings targets, for example, process time savings, workforce time savings, and the like.

The present disclosure describes examples of a comprehensive, and adaptive, solution that can track and provide insight into the overall automation initiatives, for example, by maintaining a fully auditable track of human and machine-based work and its effectiveness, seamlessly integrating robotic processes irrespective of the RPA platforms being utilized, integrating technical environments and deployment techniques, offering highly scalable and customizable setups, unifying robotic process monitoring by providing flexibility through a single view to monitor both robotic processes in conjunction with human resources performing manual process execution and virtual agents (e.g., intelligent virtual agent or virtual representative, which can be automated programs utilizing artificial intelligence (AI) to provide automated services). Further, in various embodiments, the adaptive solution can free valuable personnel from the constant and painstaking juggling between multiple RPA platform-specific dashboards and robotic process monitoring tools by delivering real-time information that can allow for further drill-down options to obtain certain information.

Many organizations, which now have a significant mix of automated tools, robotic processes, along with human resources, always look at efficient ways to manage and maximize productivity. Using one tool to monitor and manage human resources and several other tools for robotic processes and virtual agents can be a daunting task for management to integrate and draw actionable data and insight from. Also, failing to administer the entire automation cycle and measure the efficiency of each robotic process, in real-time, can hinder the optimum utilization of the robotic process, and can also become difficult to sustain long-term strategic growth.

Various embodiments described herein can overcome the above-mentioned technical challenges and obsolete the need to alternate between multiple monitoring tools to monitor the effectiveness and efficiency of the workforce. Further, various embodiments described herein can provide inbuilt, robust, reporting and analytics capability that provides in-depth insights and real-time information to improve the overall productivity of the workforce, and can provide a universal control interface for the integrated, continuous monitoring and control of the workforce that management can utilize to draw actionable insights from based on information, such as, productivity and workload, real-time event discovery and notifications, connectivity information, log management information, and other information in a unified system.

In various embodiments, a virtual resource monitoring system can be an intelligent workforce monitoring and control system that can enable real-time visibility, provisioning, dynamic governance, and compliance management for a hybrid workforce which can be, in certain embodiments, a combination heterogeneous resources that can include, for example, human resources, heterogeneous robotic processes across multiple RPA platforms, and heterogeneous virtual agents across multiple virtual agent platforms.

In some embodiments, the virtual resource monitoring system can be a universal control center for integrated, continuous monitoring, and run-time management of an entire workforce, including mechanisms for robotic process failover. In certain embodiments, the virtual resource monitoring system can help management draw actionable insights and key performance indicators, such as, for example, productivity and workload, with real-time event discovery and notification, unified connectivity, log management, and other vital information from a unified view. In some embodiments, the unified view can be in the form of a graphical dashboard display and can be, for example, single-pane and role-based. In various embodiments, the virtual resource monitoring system can also include business outcome intelligence and forecasting capabilities.

The present disclosure provides solutions, for example, that can incorporate data from robotic processes that can belong to the same or different RPA platform, can have similar or unique development and/or deployment environments, and can integrate robotic processes that may have been created either using a third-party RPA platform or an RPA platform that was custom built in-house. In other embodiments, the virtual resource monitoring system provides the flexibility to integrate with various business process management suites from a variety of third-party workflow platforms.

In various embodiments, the virtual resource monitoring system platform can utilize a unified RPA endpoint service, or system, that facilitates in establishing connectivity with individual robotic processes deployed over a variety of environments, including both physical servers and cloud servers, or combinations thereof. In some embodiments, the virtual resource monitoring system platform of the present disclosure can include various features, for example, cross-process and/or cross-platform visibility to distinguish between machine and human based tasks, identification and categorization of resources as "Active" or "Idle" workforce resources, and provide a universal RPA gateway that is capable of discovering and tracking robotic processes built and deployed via multiple third-party RPA platforms.

In certain embodiments, the gateway can capture real-time information from RPA deployments in numerous ways, allowing for varying degrees of visibility. For example, a global adapter methodology can be utilized to track robotic processes and can, optionally, allow for customization of existing robotic processes. Another example includes a wrapper methodology, which optionally, does not necessarily necessitate any customization or additional coding in existing RPA platforms, or to existing robotic processes.

In certain embodiments, run-time robotic workforce management activities can include adding or deleting robotic processes, starting, stopping or restarting robotic processes, assigning, reassigning or changing the task of a robotic process, in-depth monitoring for vital information (e.g., productivity, "Active" and "Idle" statuses, workload, robotic process health, performance, efficiency, failure, and utilization), and customizing robotic process failover mechanisms, which can optionally route work to various other resources if rectification attempts fail.

In further embodiments, run-time robotic workforce management activities can include, integration and adaptability (e.g., enabling the interfacing with a wide range of business process management systems to enable streamlined tracking of workforce performance, productivity, and other information), adding additional security by introducing an additional layer of security for the automation infrastructure by continuously monitoring the compliance needs of an organization, as per the organization's industry information security standards and best practices, and allowing for flexible deployment.

In a typical robotic process as a service model, it may be required to handle robotic processes from various RPA platforms. Without an efficient way to integrate robotic process activity, and monitor robotic process performance, it can be difficult to sustain long-term strategic growth and insight. In certain embodiments, the virtual resource monitoring system aids in attaining deeper insights into automation initiatives with in-depth, real-time, analytics and reporting, irrespective of the resource composition of the organization and irrespective of the RPA platforms used to deploy robotic processes.

In the present disclosure, various embodiments are operable to uniquely recognize and categorize "Active" and "Idle" resources irrespective of the RPA platform, virtual agent platform, or workforce management platform, thereby eliminating the need for multiple tools. In other embodiments, the virtual resource monitoring system is operable to utilize a universal RPA gateway to map and connect with robotic processes and virtual agents from heterogeneous RPA platforms, using, for example, a global RPA adapter methodology or a wrapper methodology, combinations of same and the like. In still further embodiments, the virtual resource monitoring system can be operable to provide real-time information to be displayed on a graphical dashboard, which can also, for example, provide drill-down options to look deeper into each processes running.

In various embodiments, the system disclosed herein can provide flexibility to connect with heterogeneous business process management systems to collect real-time information regarding human resources, robotic processes, and virtual agents. In some embodiments, the system of the present disclosure can provide analyses for business processes and suggest opportunities to optimize the processes further, which can assist in overall robotic process performance optimization. In some embodiments of the present disclosure, the system described herein can monitor the compliance needs of the organization's industry and provide an additional layer of security to the robotic process. Still further, in some embodiments, the system can automatically reassign tasks from a failed robotic process to a human resource, or other resource, within the workforce. In other embodiments, the system described herein can ensure that the workforce falls under a single governance framework. Furthermore, disclosed herein are systems and methods that provide the facilitation of system pools and shared data with analytical databases which can further assists in building accurate and reliable reports and metrics.

In various embodiments, the virtual resource monitoring system tracks human resources along with automation initiatives deployed in the organization, irrespective of the RPA platform, through a unified interface which can act as a convergence point to analyze the efficiency of the overall workforce, freeing valuable personnel from constant, manual, oversight and the painstaking process of using multiple robotic process-specific tools to gather useful and actionable insights. In certain embodiments, the virtual resource monitoring system tracks human resources along with automation initiatives deployed in the organization, irrespective of the RPA platform, through a unified interface gateway. In some embodiments, the virtual resource monitoring system can have a widget-based, user-friendly, customizable dashboard layout, with role-based access and views.

In certain embodiments, the virtual resource monitoring system can be operable to utilize cross-process visibility to distinguish between machine and human-based tasks, identify and categorize resources as "Active" or "Idle" workforce resources, and can utilize a universal RPA gateway that is capable of discovering and tracking robotic processes built and deployed via multiple third-party RPA platforms or custom-built RPA platforms.

FIG. 1 illustrates an example of a virtual resource management system 100. In some embodiments, the virtual resource management system 100 can include a virtual resource monitoring system (VRMS) 102, a unified RPA interface system 104, an RPA platform 106, a virtual agent platform 138, a workforce management platform 140 and a client 108 each communicatively coupled by a network 110. As depicted in FIG. 1, in certain embodiments, the RPA platform 106, the virtual agent platform 138, and the workforce management platform 140 can be a plurality of heterogeneous RPA platforms, a plurality of heterogeneous virtual agent platforms, and a plurality of heterogeneous workforce management platforms, respectively. Although for simplicity the RPA platform 106, the virtual agent platform 138, and the workforce management platform 140 are discussed relative to a single platform, it should be understood that each of these platforms can be regarded as a single platform or as multiple platforms, provided by a single provider or multiple providers, spanning across a plurality of hosts and a plurality of networks.

In some embodiments, the VRMS 102 can include a unified RPA controller 112, a monitoring module 114, a control module 116, a logging module 118, a dashboard 120, a reporting module 122, data stores 124, and an application programming interface (API) 126. In some embodiments, the monitoring module 114, the control module 116, the logging module 118, and the reporting module 122 can reside in a single module. In various embodiments, the monitoring module 114, the control module 116, the logging module 118, and the reporting module 122 can be combined into various arrangements of modules, for example, the logging module 118 and the reporting module 122 can be a single module operable to perform both functions. In some embodiments, each component illustrated within the VRMS 102 can instead reside outside of the VRMS 102 and can be configured to operate independently while communicating with each other over the network 110. In some embodiments, the network 110 can be an intranet or the Internet. In other embodiments, the network 110 can be a local area network (LAN), a wide area network (WAN), a peer-to-peer network, or combinations of same and the like.

In certain embodiments, the VRMS 102 can be capable of sending and receiving data across each component connected to the network 110. In various embodiments, the VRMS 102 can have various interface protocols, for example, transmission control protocol and the Internet protocol (TCP/IP), user datagram protocol (UDP), and the like, such that components on the network 110 such as, for example, the unified RPA interface system 104, the RPA platform 106, the virtual agent platform 138, the workforce management platform 140, and the client 108, can access the VRMS 102 to send and receive data. In other embodiments, the VRMS 102 can share information between other components within the virtual resource management system 100 in order to form a collaborative network of information that can be stored within the data stores 124. In various embodiments, the VRMS 102 can provide raw computing power in order to facilitate various computations that may be required, for example, by each module within the VRMS 102 or the unified RPA interface system 104.

In certain embodiments, the monitoring module 114 is operable to perform workforce monitoring, for example, the monitoring module 114 can be operable to monitor the virtual agent platform 138 and the workforce management platform 140. In various embodiments, the control module 116 can perform certain tasks relating to robotic process optimization, robotic process security enhancement, runtime workforce management, business process optimization, robotic process failover functions, robotic process governance framework management, robotic process deployment management, and perform role-based read/write access functions, for example granting read/write access to each component within the virtual resource management system 100. In certain embodiments, the control module 116 can be operable to perform functions that can include, for example, adding or deleting robotic processes, starting, stopping, or restarting robotic processes, assigning, reassigning, or changing robotic processes, or combinations of same and the like. In various embodiments, the control module 116 can be operable to perform functions that can include information gathering determinations, for example, robotic process productivity, robotic process "Active" and "Idle" statuses, robotic process workload, robotic process health, robotic process performance, robotic process efficiency, robotic process failures, and robotic process utilization.

In various embodiments, the unified RPA controller 112 can perform certain tasks relating to robotic process optimization, robotic process security enhancement, run-time workforce management, business process optimization, robotic process failover functions, robotic process governance framework management and robotic process deployment management, and perform role-based read/write access functions, for example grant read/write access to each component within the virtual resource management system 100. In certain embodiments, the unified RPA controller 112 can be operable to perform functions that can include, for example, adding or deleting robotic processes, starting, stopping, or restarting robotic processes, assigning, reassigning, or changing robotic processes, or combinations of same and the like. In various embodiments, the unified RPA controller 112 can be operable to perform functions that can include information gathering determinations, for example, robotic process productivity, robotic process "Active" and "Idle" statuses, robotic process workload, robotic process health, robotic process performance, robotic process efficiency, robotic process failures, and robotic process utilization, in a similar fashion to that of the control module 116.

In certain embodiments, the unified RPA controller 112 can perform certain tasks relating to robotic process optimization, robotic process security enhancement, robotic process failover functions, robotic process governance framework management, robotic process deployment management, and can utilize other components of the VRMS 102 for robotic process management, for example, the control module 116, the monitoring module 114, the logging module 118, and the reporting module 122.

In certain embodiments, the unified RPA controller 112 can be operable to perform functions that can include, for example, adding or deleting robotic processes, starting, stopping, or restarting robotic processes, assigning, reassigning, or changing robotic processes, or combinations of same and the like. In various embodiments, the unified RPA controller 112 can be operable to perform functions that can include information gathering determinations, for example, robotic process productivity, robotic process "Active" and "Idle" statuses, robotic process workload, robotic process health, robotic process performance, robotic process efficiency, robotic process failures, and robotic process utilization. In some embodiments, the monitoring module 114 can monitor some or all workforce processes within the virtual resource management system 100, for example, the monitoring module 114 can be operable to monitor the virtual agent platform 138, the workforce management platform 140, the client 108, and the RPA platform 106, for example, via the unified RPA controller 112. In certain embodiments, the monitoring module 114 can store relevant monitoring data in the data stores 124 utilizing, for example, the logging modules 118.

In various embodiments, the monitoring module 114 can be operable to perform compliance monitoring, in-depth robotic process monitoring for service level agreement (SLA) information and key performance indicators (KPIs), using various modules within the VRMS 102, for example, the logging module 118 and the control module 116. Various functionality of the monitoring module 114 will be discussed in more detail below with respect to FIG. 8. In certain embodiments, the logging module 118 is operable to log any information about any component within the virtual resource management system 100. For example, the logging module 118 can log information produced by the monitoring module 114, the control module 116, the reporting module 122, the unified RPA controller 112, and interactions with the client 108. In certain embodiments, the logging module 118 can also log information pertaining to the virtual agent platform 138 and the workforce management platform 140 utilizing, for example, the API 126. In various embodiments, the logging module 118 can be utilized in conjunction with reporting module 122 to enable auditable activity log management. In certain embodiments, the logging module 118 can store relevant logging data in the data stores 124.

In some embodiments, the reporting module 122 can be operable to generate business process management reports, inbuilt analytics, and detailed reporting about each component within the virtual resource management system 100. In some embodiments, the reporting module 122 is operable to generate reports relating to, for example, robotic process optimization, robotic process security, run-time workforce management (e.g., adding or deleting robotic processes, starting, stopping, or restarting robotic processes, assigning, reassigning, or changing robotic processes, or combinations of same and the like), business process optimization, robotic process failover, robotic process governance framework management, robotic process deployment, robotic process activity state (e.g., "Active." "Idle." "Stopped,"), SLA information, KPI information, and combinations of same and the like. In certain embodiments, the reporting module 122 is operable to create reports on any information obtained from the monitoring module 114 or the logging module 118. In some embodiments, reports generated by the reporting module 122 can be stored within the data stores 124. In various embodiments, the reporting module 122 can be operable to create and distribute reports to the dashboard 120 or directly to the client 108. In some embodiments, reports can be accessed directly via the API 126. In various embodiments, the reporting module 122 can trigger alerts or notifications to users when specific events have been detected by the logging module 118, the control module 116, the monitoring module 114, or the unified RPA controller 112.

In some embodiments, the reporting module 122 can be utilized to send reports or alerts to the dashboard 120, the client 108, or any device connected to the network 110. In various embodiments, the reports and alerts provided by the reporting module 122 can be provided real-time and/or at specific time intervals as desired. In other embodiments, the reporting module 122 generates reports and/or alerts based on pre-determined triggers. In other embodiments, the reporting module 122 can be utilized by any component within VRMS 102 or the client 108 on the network 110. In some embodiments, the alerts can be sent via electronic mail and/or any other electronic alert medium, including but not limited to, RSS feeds, push notifications. SMS notifications, or combinations of same and the like. In some embodiments, the reporting module 122 includes a separate graphical user interface (GUI) for the accessing alerts and reports by the client 108, thereby bypassing the dashboard 120. In other embodiments, the reporting module 122 can execute an automatic process that creates reports and alerts without manual interaction.

In certain embodiments, the dashboard 120 is operable to control some or all modules within the VRMS 102 or the unified RPA interface system 104, and send and receive information to and from the RPA platform 106, the virtual agent platform 138, and the workforce management platform 140. In some embodiments, the dashboard 120 can display some or all reporting information generated by the reporting module 122 or the logging information generated by the logging module 118. In various embodiments, the dashboard 120 is operable to maintain some or all robotic processes across a plurality of RPA platforms, for example, the RPA platform 106. In some embodiments, the reporting module 122 generates reports based on logging information stored on the data store 124, which data can be created by, for example, the logging module 118. The reporting module 122 can also display reported data on the dashboard 120, accessible by a user, via the client 108.

In various embodiments, the dashboard 120 can be a GUI accessible by a user via the client 108. In certain embodiments, the dashboard 120 is operable to graphically display information, such as, the number of robotic processes on each RPA platform, for example the RPA platform 106, the number of human resources on each of the workforce management platforms, for example, the workforce management platform 140, and the number of virtual agents on each of the virtual agent platforms, for example, the virtual agent platform 138. In various embodiments, the dashboard 120 can be a graphical display of each task currently being performed on the virtual resource management system 100, and can include information, such as, average productivity, task progress, status, assigned tasks, location, combinations of same and the like. In various embodiments, the dashboard 120 can be utilized to control resources utilizing the control module 116 or the unified RPA controller 112. An example graphical interface that can be provided by the VRMS 102 via the dashboard 120 will be described below in more detail with respect to FIG. 9

In certain embodiments, the virtual resource management system 100 includes a plurality of RPA platforms. For simplicity, however, the RPA platform 106 will be described as a single RPA platform. It should be appreciated that, in some embodiments, the RPA platform 106 can be representative of a plurality of heterogeneous RPA platforms.

In various embodiments, the RPA platform 106 includes, or has resident thereon, a plurality of robotic processes 132, and in particular a robotic process 134. In certain embodiments, the robotic process 134 can be any automated process, for example, automated tasks, artificial intelligence (AI) workers, many hundreds or thousands of software agents that automatically perform a sequence of computer-implemented tasks, combinations of same and the like. In various embodiments, the RPA platform 106 includes configurations 128, data stores 130, and an API 136. In certain embodiments, the configurations 128 can be a custom, function-specific, configuration. In other embodiments, the configurations 128 can be platform-dependent, as specified by an RPA platform provider. In some embodiments, the configurations 128 can be stored in the data stores 130. In further embodiments, the configurations 128 can be absent from the RPA platform 106, for example, when the RPA platform provider provides no means of configuration, or a tenant of the RPA platform 106 requires no additional function-specific configurations on the RPA platform 106. In certain embodiments, the configurations 128 can be stored within the VRMS 102, for example, if the function-specific configurations are to be performed at the unified RPA interface system 104 (described in more detail below with respect to FIGS. 4 and 7). In various embodiments, the configurations 128 can be stored in the data stores 130. In other embodiments, the configurations 128 can include one or more specific configurations that reside on the robotic process 134 in the form of an agent. In still further embodiments, the configurations 128 can be built into the robotic process 134 or the RPA platform 106.

In some embodiments, the unified RPA interface system 104 is operable to act as a gateway between the VRMS 102 and a plurality of RPA platforms, which can include the RPA platform 106. In certain embodiments, the unified RPA interface system 104 resides as a system separate from the VRMS 102. In certain embodiments, the unified RPA interface system 104 resides within the VRMS 102. In other embodiments, the unified RPA interface system 104 can reside within the RPA platform 106. In further embodiments, the unified RPA interface system 104 can be representative of a logical wrapper on the RPA platform 106 and wrap, for example, the robotic process 134, the robotic processes 132, the configurations 128, the data stores 130, the API 136, or any combination thereof. It should be appreciated that in various embodiments, the unified RPA interface system 104 can act as a logical wrapper that may or may not physically reside on the RPA platform 106. In certain embodiments, the unified RPA interface system 104 acts as a global adapter operable to interface with the API 136 and can, in certain embodiments, reside within the VRMS 102. In certain embodiments, the unified RPA interface system 104, whether acting as a wrapper or a global adapter, can reside within the VRMS 102.

In various embodiments, the unified RPA interface system 104 can perform certain tasks relating to robotic process optimization, robotic process security enhancement, runtime workforce management, business process optimization, robotic process failover functions, robotic process governance framework management, robotic process deployment management, and perform role-based read/write access functions, for example grant read/write access to each component within the virtual resource management system 100. In certain embodiments, the unified RPA interface system 104 can be operable to perform functions that can include, for example, adding or deleting robotic processes, starting, stopping, or restarting robotic processes, assigning, reassigning, or changing robotic processes, or combinations of same and the like. In various embodiments, the unified RPA interface system 104 can be operable to perform functions that can include information gathering determinations, for example, robotic process productivity, robotic process "Active" and "Idle" statuses, robotic process workload, robotic process health, robotic process performance, robotic process efficiency, robotic process failures, and robotic process utilization.

Various example functionalities of the unified RPA interface system 104 operating as a wrapper will be discussed in further detail below with respect to FIGS. 3 and 6, while various example functionalities of the unified RPA interface system 104 operating as a global adapter will be discussed in further detail below with respect to FIGS. 4 and 7. In certain embodiments, the VRMS 102 communicates with, and provides a gateway to, the RPA platform 106 via the unified RPA interface system 104. In some embodiments, the unified RPA interface system 104 can reside anywhere within the virtual resource management system 100 logically or physically. In still further embodiments, the unified RPA interface system 104 can be operable to communicate with the VRMS 102 via the unified RPA controller 112. In certain embodiments, the unified RPA interface system 104 can communicate with the API 126, or any other component of the VRMS 102.

In certain embodiments, the virtual resource management system 100 includes a plurality of virtual agent platforms. For simplicity, however, the virtual agent platform 138 will be described as a single virtual agent platform. It should be appreciated that, in some embodiments, the virtual agent platform 138 can be representative of a plurality of heterogeneous virtual agent platforms. In some embodiments, a virtual agent can be a computer-generated AI virtual interface that can offer cognitive, conversational, self-service experience and that can provide answers to questions and take various actions. In some embodiments, virtual agents can be customized to fit specific business needs or provide custom content. Additionally, deep analytics can be utilized to provide insights on engagements with the virtual agents, and in some embodiments, these insights can assist with understanding specific business needs.

In some embodiments, the virtual resource management system 100 includes a plurality of workforce management platforms. For simplicity, however, the workforce management platform 140 will be described as a single workforce management platform. It should be appreciated that, in some embodiments, the workforce management platform 140 can be representative of a plurality of heterogeneous workforce management platforms. In various embodiments, the workforce management platform 140 helps gain visibility into business metrics, such as, productivity at a particular time of day or the amount of time it typically takes for workers to accomplish a given task. In some embodiments, the workforce management platform 140 is operable to handle labor scheduling, time and work data collection, leave management, task and activity management, time and attendance, or combinations of same and the like.

In various embodiments, the functionality of the unified RPA controller 112, the monitoring module 114, the control module 116, the logging module 118, the dashboard 120, the reporting module 122, the data stores 124, can be made accessible to the client 108 via the network 110, and can be accessed, for example, by utilizing the API 126. In some embodiments, functionality of the configurations 128, the data stores 130, the robotic processes 132, for example, the robotic process 134, can be made accessible to the client 108 via the network 110, and can be accessed, for example, by utilizing the API 136. In further embodiments, the functionality of the unified RPA interface system 104, the virtual agent platform 138, and the workforce management platform 140 can be made accessible to the client 108 via the network 110. In various embodiments, the virtual resource management system 100 can contain a plurality of clients. In various embodiments, the client 108 can include, for example, thin clients, desktop computers, laptop computers, tablet computers, smart phones, wearable or body-borne computers, or combinations of same and the like.

Figure 2:
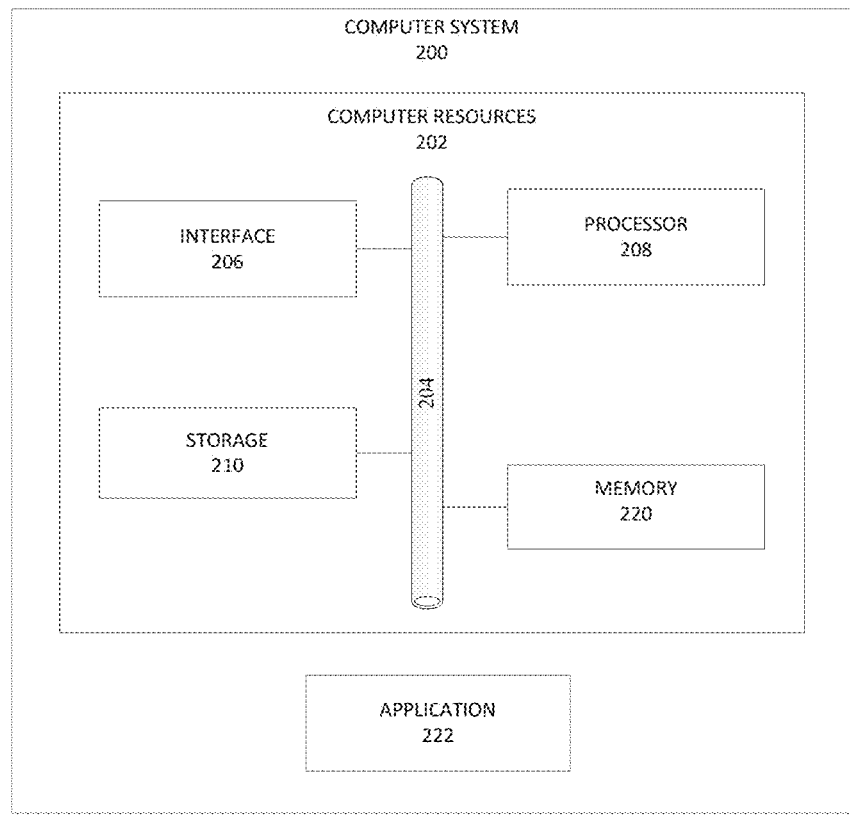
FIG. 2 illustrates an example of a computer system.

FIG. 2 illustrates an example of a computer system 200 that, in some cases, can be representative, for example, the VRMS 102, the unified RPA interface system 104, the RPA platform 106, the virtual agent platform 138, the workforce management platform 140, and the client 108. The computer system 200 includes an application 222 operable to execute on computer resources 202. The application 222 can be, for example, an interface for operating the unified RPA controller 112, the monitoring module 114, the control module 116, the logging module 118, the dashboard 120, and the reporting module 122. In other embodiments, the application 222 can be, for example, an interface for operating and/or accessing the configurations 128, the virtual agent platform 138, and the workforce management platform 140. In further embodiments, the application 222 can be, for example, an interface for operating and/or accessing the data stores 124 and the data stores 130. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components. (e.g., memory 220), the application 222. Such functionality may include providing various features discussed herein. In particular embodiments, processor 208 may include hardware for executing instructions, such as those making up the application 222. As an example and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses.

Depending on the embodiment, processor 208 may include any suitable number of any suitable internal registers, where appropriate. Where appropriate, processor 208 may include one or more arithmetic logic units (ALUs); be a multi-core processor include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may comprise any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
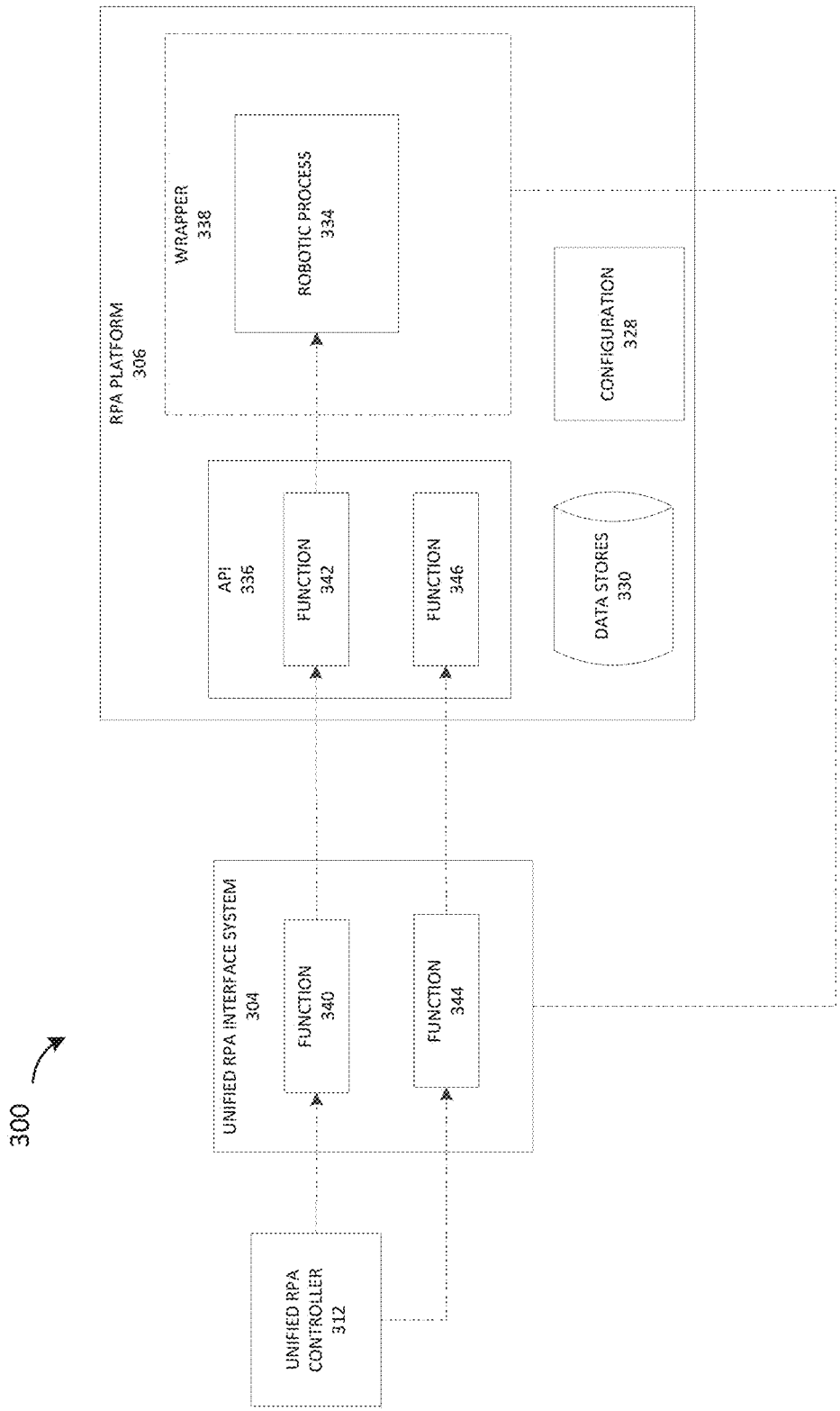
FIG. 3 illustrates an example system demonstrating function calls in an example embodiment of a unified robotic process automation (RPA) interface system operable to be utilized as a wrapper.

FIG. 3 illustrates an example system 300 in which a unified interface system is operable to logically wrap one or more robotic processes. The system 300 is shown to include a unified RPA controller 312, which can operate similarly to the unified RPA controller 112 of FIG. 1, a unified RPA interface system 304, which can operate similarly to the unified RPA interface system 104 of FIG. 1, and an RPA platform 306, which can operate similarly to the RPA platform 106 of FIG. 1. It should be appreciated that, although the diagram illustrates a single RPA platform and a single robotic process, in various embodiments, a plurality of RPA platforms with a plurality of robotic processes can exist in any given virtual resource management system.

In various embodiments, the unified RPA interface system 304 can include a plurality of functions, with two being shown in FIG. 3 for illustrative purposes, namely, function 340 and function 344. It should be understood that, while the unified RPA interface system 304 is shown to include two specific example functions, the unified RPA interface system 304 can include any suitable number of functions for a given implementation.

The RPA platform 306 can include an API 336, a robotic process 334, configurations 328, and data stores 330 that operate similarly to the API 136, the robotic process 134, the configurations 128, and the data stores 130, respectively, of FIG. 1. More particularly, in certain embodiments, the API 336 can include a plurality of functions such as, for example, function 342 and function 346. It should be appreciated that the function 342 and the function 346 are illustrative only, and that the API 336, similar to the unified RPA interface system 304, can include a plurality of many functions. It should be appreciated that the robotic process 334 is illustrated as a single robotic process for simplicity and brevity; however, in a typical embodiment, the RPA platform 306 can include a plurality of robotic processes.

In the illustrated embodiment, the unified RPA interface system 304 is shown to "wrap" the robotic process 334 via wrapper 338. In a typical embodiment, the wrapper 338 does not exist separately from the unified RPA interface system 304 but rather is a logical representation of a role performed by the unified RPA interface system 304 with respect to the robotic process 334. The unified RPA interface system 304, in its capacity as the wrapper 338, can expose a simplified, standard point of access, for example, for certain defined information or control functionality related to the robotic process 334. As shown, the simplified, standard point of access represented by the wrapper 338 can be exposed, for example, to the unified RPA controller 312, in the form of the function 340 and the function 344. In some embodiments, the unified RPA interface system 304 can include macro-level tracking of the robotic process 334 or the RPA platform 306.

In certain embodiments, for each function call that the unified RPA interface system 304 receives from the unified RPA controller 312, for example, in its role as the wrapper 338 for the robotic process 334, the unified RPA interface system 304 can initiate calls or communications on the RPA platform 306 that result in requested information being obtained or requested functionality being performed. In this fashion, the unified RPA interface system 304, in its capacity as the wrapper 338, can abstract, from the unified RPA controller 312 and/or other components, the way in which communication with the API 336 and/or the robotic process 334 occurs. Therefore, in certain embodiments, the wrapper 338 for the robotic process 334 and, for example, another wrapper for a robotic process on another RPA platform, can each expose a similar, or identical, simplified interface, although the details of how certain functions are implemented could be different within each wrapper in correspondence to API differences and other differences between the two platforms. Advantageously, in certain embodiments, the unified RPA interface system 304 can eliminate the need to modify either an interface published to the unified RPA controller 312, for example, via the function 340 and the function 344, or the API 336 of the RPA platform 306. Rather, differences can be accommodated by the unified RPA interface system 304 in its role as the wrapper 338.

In an example, the unified RPA controller 312 can invoke, or call, the function 340, using appropriate arguments, or no arguments, as applicable. Thereafter, the unified RPA interface system 304, in accordance with how the function 340 is defined, can invoke, or call, the function 342 of the API 336. This call or invocation can, in some cases, result in a call to, or communication with, the robotic process 334. According to this example, the function 340 contains programming sufficient to cause the invocation of the function 342. In certain embodiments, a reply, or data generated by the function 342, is returned, or sent back, to the unified RPA interface system 304. In some embodiments, the reply (or function call reply) can be data generated by the function 342. In various embodiments, the unified RPA interface system 304 can process the reply and prepare the reply to be sent to the unified RPA controller 312.

In another example, the unified RPA controller 312 can invoke, or call, the function 344, using appropriate arguments, or no arguments, as applicable. Thereafter, the unified RPA interface system 304, in accordance with how the function 344 is defined, can invoke, or call, the function 346 of the API 336. According to this example, the function 346 can perform certain control functionality such as, for example, starting or stopping the robotic process 334, provide certain data or information about the robotic process 334, for example, from the data stores 330, or perform other functionality. In general, however, the function 344 contains programming sufficient to cause the invocation of the function 346.

For simplicity of illustration, the wrapper 338 is shown via a dashed-line box around the robotic process 334. However, it should be appreciated that, in various embodiments, the wrapper 338 can encompass a simplified interface for any information or control related to the robotic process 334. For example, the unified RPA interface system 304, in its capacity as the wrapper 338, can abstract communication with the API 336, the configurations 328, the data stores 330, the robotic process 334, other components of the RPA platform 306, the RPA platform 306, combinations of same and/or the like.

In some embodiments, the unified RPA interface system 304, in its role as the wrapper 338, can translate a standardized function call, for example, to the function 340 or the function 344, to a call to a corresponding function within the RPA platform 306 (e.g., a call to the function 342 or the function 346), thereby allowing for an interface that is operable to interact with a plurality of RPA platforms without specific customization of each RPA platform of the plurality of RPA platforms. Periodically herein, for simplicity of description, data or calls may be referred to as being sent to or received from the wrapper 338, although the wrapper 338 is typically a logical representation of functionality performed by the unified RPA interface system 304.

While FIG. 3 illustrates function calls as dashed arrows in the direction of the call, it should be appreciated that FIG. 3 is illustrative of function calls only, and that data and/or replies can be sent and received though various means, for example, traversing back through the function call pathway, sent directly to the unified RPA interface system 304, or sent directly to the unified RPA controller 312. For example, if the unified RPA controller 312 invokes the function 340, an example data flow for a reply would flow from the robotic process 334, through the API 336, via the function 342, through the unified RPA interface system 304, via the function 340, to the unified RPA controller 312. In this example, the data flows reverse that of the function call flow.

In some embodiments, the function 340 and the function 344 can be representative of functions that can, for example, determine operational statuses of the robotic process 334 or the RPA platform 306. In some embodiments, the function 340 and the function 344 can be processes to send start or stop commands to the robotic process 334, or to identify processing time of the robotic process 334. In some embodiments, the function 340 and the function 344 can be representative of functions that can, for example, perform any function mentioned above with respect to the unified RPA controller 112 of FIG. 1 or the control module 116 of FIG. 1. In some embodiments, the unified RPA interface system 304 can include functionality, with respect to the function 340 and the function 344, similar to the functionality of the control module 116 of the VRMS 102 of FIG. 1. Further embodiments allow for the functions within the unified RPA interface system 304 to be similar to the functionality of the unified RPA controller 112 of FIG. 1. In various embodiments, some or all function calls can be logged by, for example, the logging module 118 of FIG. 1 and reported by, for example, the reporting module 122 of FIG. 1. In certain embodiments, some or all information obtained via functions routed through the unified RPA interface system 304 can be displayed on a dashboard, for example, the dashboard 120 of FIG. 1. In certain embodiments, some or all function calls can be monitored by, for example, the monitoring module 114 of FIG. 1.

In certain embodiments, functions can include, for example, adding or deleting robotic processes, starting, stopping, or restarting robotic processes, assigning, reassigning, or changing robotic processes, or combinations of same and the like. In various embodiments, functions can include information gathering determinations, for example, robotic process productivity, robotic process "Active" and "Idle" statuses, robotic process workload, robotic process health, robotic process performance, robotic process efficiency, robotic process failures, and robotic process utilization. In other embodiments, functions can include various task related instructions that can be operable to, for example, perform certain tasks relating to robotic process optimization, robotic process security enhancement, run-time workforce management, business process optimization, robotic process failover functions, robotic process governance framework management, and robotic process deployment management.

Figure 4:
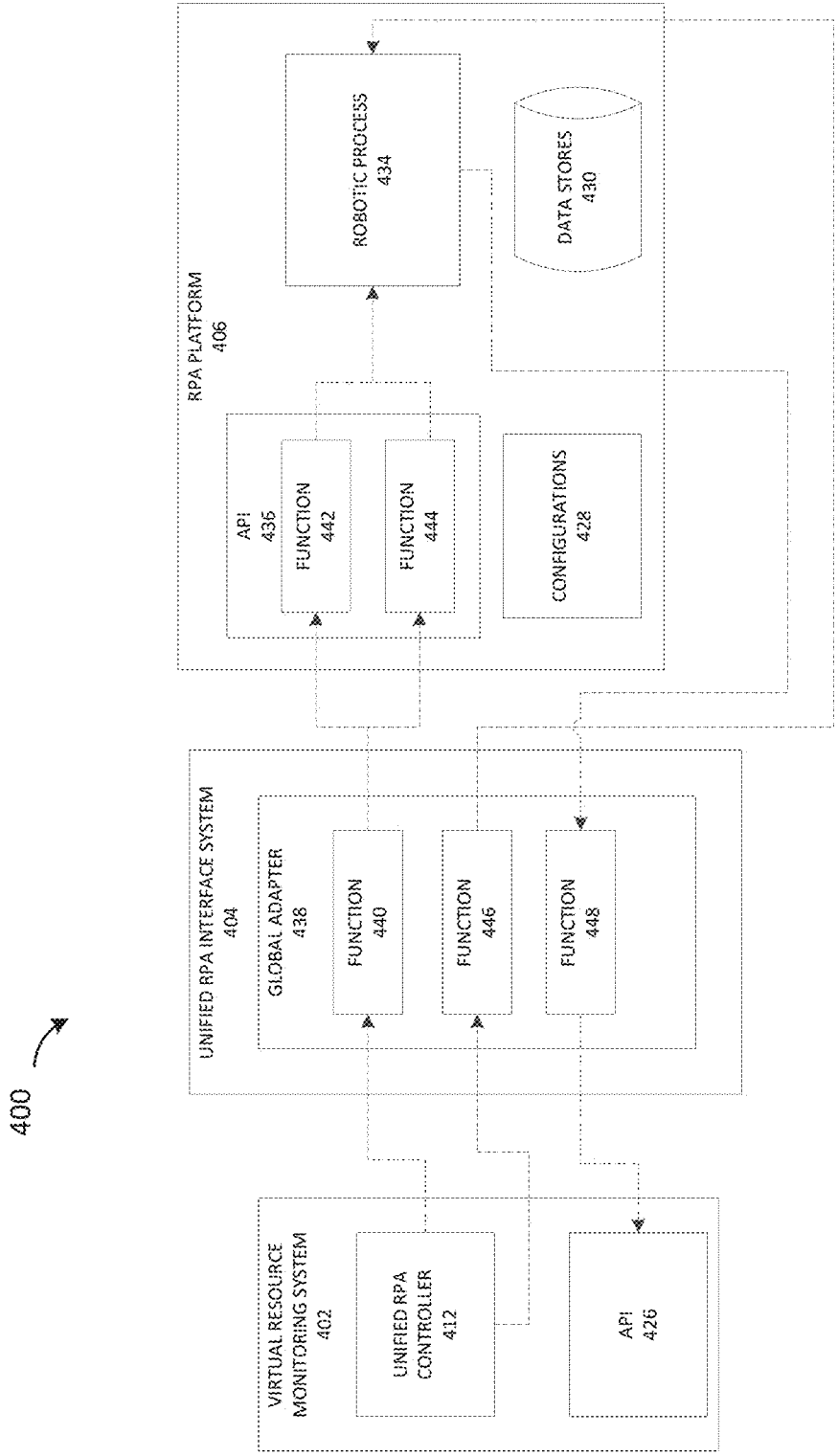
FIG. 4 illustrates an example system demonstrating function calls in an example embodiment of a unified RPA interface system operable to be utilized as a global adapter.

FIG. 4 illustrates an example system 400 in which a unified interface system is operable to serve as a global adapter. The system 400 is shown to include a VRMS 402, which can operate similarly to the VRMS 102 of FIG. 1, a unified RPA interface system 404, which can operate similarly to the unified RPA interface system 104 of FIG. 1, and an RPA platform 406, which can operate similarly to the RPA platform 106 of FIG. 1. It should be appreciated that, although the diagram illustrates a single RPA platform and a single robotic process, in various embodiments, a plurality of RPA platforms with a plurality of robotic processes can exist in any given virtual resource management system.

In various embodiments, the VRMS 402 can include a unified RPA controller 412, with similar functionality to the unified RPA controller 112 of FIG. 1, and an API 426, with similar functionality to the API 126 of FIG. 1. In the illustrated embodiment, the unified RPA interface system 404 includes a global adapter 438. The global adapter 438 can include a plurality of functions, with three being shown in FIG. 4 for illustrative purposes, namely, function 440, function 446, and function 448. Although the global adapter 438 is shown to include three functions for illustrative purposes, it should be appreciated that the global adapter 438 can include any suitable number of functions.

The RPA platform 406 can include an API 436, a robotic process 434, configurations 428, and data stores 430 that operate similarly to the API 136, the robotic process 134, the configurations 128, and the data stores 130, respectively, of FIG. 1. More particularly, in certain embodiments, the API 436 can include a plurality of functions such as, for example, function 442 and function 446. It should be appreciated that the robotic process 434 is illustrated as a single robotic process for simplicity and brevity; however, in a typical embodiments, the RPA platform 406 includes a plurality of robotic processes. It should further be appreciated that, although the API 436 is shown to include a particular number of functions, in various embodiments, the API 436 can include any suitable number of functions.

In various embodiments, the configurations 428 can be stored in the data stores 430. In other embodiments, the configurations 428 can be, or include, one or more specific configurations that reside on the robotic process 434 in the form of an agent. In still further embodiments, the configurations 428 can be built into the robotic process 434 or the RPA platform 406. In some embodiments, the configurations 428 can reside within the unified RPA interface system 404. In some embodiments, the configurations 428 can be, or include, one or more function-specific configurations capable of identifying and performing varying tasks relative to identified functions on either the global adapter 438 or the RPA platform 406, as will be discussed in further detail below with respect to FIG. 7.

In certain embodiments, the configurations 428 can include settings or other data that alter, or customize, at least in part, the behavior or operation of the robotic process 434 and/or the API 436. For example, the configurations 428 can include parameters that impact how values are computed, parameters that impact which values are logged, a sampling period or frequency for logged values, accuracy thresholds, combinations of same and/or the like. For example, the configurations 428 could modify function call replies to include a multiplier to account for network latency. In another example, the configurations 428 can instruct the function 442 and/or the function 444 to provide differing replies than would normally be sent by the function 442 and the function 444, for example, the configurations 428 could instruct replies from the function 442 and the function 444 to send a debug reply of "DEBUG" to indicate the RPA platform 406 is currently being debugged.

In certain embodiments, the global adapter 438 can be implemented in conjunction with changes to the 428, such that the API 436 and/or the robotic process 434 will produce performance data or other values in an expected format. For example, if the function 440 of the global adapter 438 is expected to produce a mean value based on an hourly sampling interval, the configurations 428 could be modified such that the robotic process 434 produces hourly samples of a given metric.

In certain embodiments, the unified RPA interface system 404 and, more particularly, the global adapter 438, can share some or all of the characteristics described with respect to the unified RPA interface system 304 of FIG. 3. The global adapter 438, in similar fashion to the unified RPA interface system 304 in its capacity as the wrapper 338, can expose a simplified, standard point of access, for example, for certain defined information or control functionality related to the robotic process 434. As shown, the simplified, standard point of access can be exposed, for example, to the unified RPA controller 412, in the form of the function 440, the function 444, and the function 448.

In certain embodiments, the unified RPA controller 412 does not need to directly interact with the RPA platform 406, the robotic process 434, or the API 436 to obtain information about the robotic process 434 or the RPA platform 406. Rather, in certain embodiments, the global adapter 438 acts as a gateway to the RPA platform 406 to provide a more controlled exchange of data and more detailed analysis and control of the robotic process 434 or the RPA platform 406. For each function call that the global adapter 438 receives from the unified RPA controller 412, the global adapter 438 can initiate calls or communications on the RPA platform 406 that result in requested information being obtained or requested functionality being performed. In this fashion, the global adapter 438 can abstract, from the unified RPA controller 412 and/or other components, the way in which communication with the API 436 and/or the robotic process 434 occurs. Therefore, in certain embodiments, the global adapter 438 and, for example, an adapter for another RPA platform, could each expose a similar, simplified interface, although the details of how certain functions are implemented could be different within each wrapper in correspondence to API differences and other differences between the two platforms.

In some embodiments, the global adapter 438 can be used to generate new data not natively provided by a given RPA platform such as the RPA platform 406. This generation of new data can be performed as part of homogenizing disparate data provided by different RPA platforms such as RPA platform 406. Consider an example in which the unified RPA controller 412 needs a processing time of the robotic process 434 (e.g., for a report or dashboard), but defines processing time differently than the RPA platform 406. According to this example, the unified RPA controller 412 may define processing time in such a way that excludes initialization time, while the RPA platform 406 may define processing time in way that includes initialization time. For purposes of this example, the function 442 of the API 436 of the RPA platform 406 may provide processing time as defined by the RPA platform 406, such that processing time is included, and the function 444 may provide initialization time.

According to the above example involving processing time, the unified RPA controller 412 can invoke, or call, the function 440 of the global adapter 438 to request processing time. The function 440 of the global adapter 438, as exposed to the unified RPA controller 412, may be defined to provide processing in the precise fashion defined by the unified RPA controller 412 given an argument that identifies, for example, the robotic process 434. To generate the processing time, the function 440 can include programming to invoke, or call, the function 442 and the function 444 of the API 436 to receive processing time (as defined by the RPA platform 406) and initialization time, respectively, of the robotic process 434, and thereafter subtract the latter value from the former value. In this way, the function 440 can produce, to the unified RPA controller 412, processing time according to its own definition of the metric. In certain embodiments, processing time according to the definition of the unified RPA controller 412 would provide for a more detailed analysis of actual time spent processing a task performed by the robotic process 434 to identify, for example, if the task itself needed to be improved.

In other embodiments, the configurations 428 can instruct the function 442 and the function 444 to provide differing replies than would normally be sent by the function 442 and the function 444, for example, the configurations 428 could instruct replies from the function 442 and the function 444 to send a debug reply of "DEBUG" to indicate the RPA platform 406 is currently being debugged. In some embodiments, the reply (or function call reply) can be data generated by a function, an invocation of another function, processes to perform, a separate function that can be invoked on various components, combinations of same and the like.

In certain embodiments, the unified RPA controller 412 can utilize the unified RPA interface system 404, via the global adapter 438, to invoke functions on, or otherwise directly communicate with, the robotic process 434, thereby bypassing the API 436. This can be advantageous if, for example, the API 436 does not include all functions desired by an organization. For example, the unified RPA controller 412 can invoke the function 446 of the global adapter 438. Continuing the example, after the unified RPA controller 412 invokes the function 446, the global adapter 438 can directly call or communicate with the robotic process 434, thereby bypassing the API 436 of the RPA platform 406. In some embodiments, this can be done to avoid the API 436, for example, so as to eliminate, replace, supplement, or bypass native functions of the API 436. In this example, the global adapter 438 is operable to communicate directly with the robotic process 434.

In various embodiments, the robotic process 434 is operable to communicate with the VRMS 402 utilizing the global adapter 438. For example, if the robotic process 434 identifies that it is in an "Idle" state, the robotic process 434 can request another task. In this example, the robotic process 434 would invoke the function 448 within the global adapter 438. In some embodiments, the configurations 428 can allow function-specific information that allows for the robotic process 434 to determine its state (e.g., "Active," "Idle," or "Stopped"), and determine whether or not the robotic process 434 needs to invoke a request to the VRMS 402. In this example, the function 448 within the global adapter 438 can directly call the API 426 of the VRMS 402 and could include a request for further tasks.

In some embodiments, the unified RPA interface system 404 or the global adapter 438 can connect to the RPA platform 406 through TCP/IP, hypertext transfer protocol (HTTP), or secure HTTP (HTTPS) protocols. In some embodiments, the unified RPA interface system 404 or the global adapter 438 can act as a representational state transfer (REST) service that can be invoked via HTTP or HTTPS. In some embodiments, the unified RPA interface system 404 or the global adapter 438 can have multiple functions for detailed data exchange and the processes can begin when the robotic process 434 is initiated. For Example, a function within the global adapter 438 can assist in capturing error information from the robotic process 434 and could be called within an exception block of a particular configuration in, for example, the configurations 428. In some embodiments, the global adapter functions could alert the VRMS 402 when an error or exception of the robotic process 434 is identified. In some embodiments, the global adapter 438 can be customized to tenant-specific specifications to provide detailed insight and control to the robotic process 434 and the RPA platform 406. In some embodiments, the global adapter 438 can include tenant-specific functions to identify, for example, process times, latency, success rate of the robotic process 434, performance optimization, average productivity, capacity handled by the robotic process 434, exception handling, or combinations of same and the like.

In certain embodiments, the global adapter 438 can reside outside of the unified RPA interface system 404 or within the unified RPA interface system 404. In certain embodiments, the global adapter 438 can reside inside the VRMS 402. In some embodiments, the global adapter 438 can reside within the unified RPA interface system 404 while the unified RPA interface system 404, itself, resides within the VRMS 402. In various embodiments, some or all function calls can be logged by, for example, the logging module 118 of FIG. 1 and reported, for example, by the reporting module 122 of FIG. 1. In various embodiments, some or all function calls can be monitored by, for example, the monitoring module 114 of FIG. 1. In certain embodiments, some or all information obtained via functions routed through the unified RPA interface system 404 or the global adapter 438 can be displayed on a dashboard, for example, the dashboard 120 of FIG. 1. In some embodiments, the global adapter 438 or the unified RPA interface system 404 can be used to provide micro-level, or granular, information about the robotic process 434 or the RPA platform 406.

While FIG. 4 illustrates function calls as dashed arrows in the direction of the call, it should be appreciated that FIG. 4 is illustrative of function calls only, and that data and/or replies can be sent and received though various means, for example, traversing back through the function call pathway, sent directly to the unified RPA interface system 404, sent directly to the global adapter 438, sent directly to the unified RPA interface system 404, sent directly to the VRMS 402, sent directly to the unified RPA controller 412, or sent directly to the API 426. For example, if the unified RPA controller 412 invokes the function 440, an example data flow for a reply would flow from the robotic process 434, through the API 436, via the function 442 and the function 444, through the unified RPA interface system 404, via the function 440, to the unified RPA controller 412. In this example, the data flows reverse that of the function call flow.

In some embodiments, the function 440, the function 446, and the function 448 can be representative of functions that can, for example, determine statuses of the robotic process 434 or the RPA platform 406. In some embodiments, the function 440, the function 446, and the function 448 can be processes to send start or stop commands to the robotic process 434, or identify processing time of the robotic process 434. In some embodiments, the function 440, the function 446, and the function 448 can be representative of functions that can, for example, be similar in fashion as function mentioned above with respect to the unified RPA controller 112 of FIG. 1 or the control module 116 of FIG. 1. In some embodiments, the global adapter 438 can include functionality, with respect to the function 440, the function 446, and the function 448, similar to that as the control module 116 of the VRMS 102 of FIG. 1. Further embodiments allow for the functions within the global adapter 438 to be similar to functionality of the unified RPA controller 112 of FIG. 1.

In certain embodiments, functions can include, for example, adding or deleting robotic processes, starting, stopping, or restarting robotic processes, assigning, reassigning, or changing robotic processes, or combinations of same and the like. In various embodiments, functions can include information gathering determinations, for example, robotic process productivity, robotic process "Active" and "Idle" statuses, robotic process workload, robotic process health, robotic process performance, robotic process efficiency, robotic process failures, and robotic process utilization. In other embodiments, functions can include various task related instructions that can be operable to, for example, perform certain tasks relating to robotic process optimization, robotic process security enhancement, run-time workforce management, business process optimization, robotic process failover functions, robotic process governance framework management, and robotic process deployment management.

Figure 5:
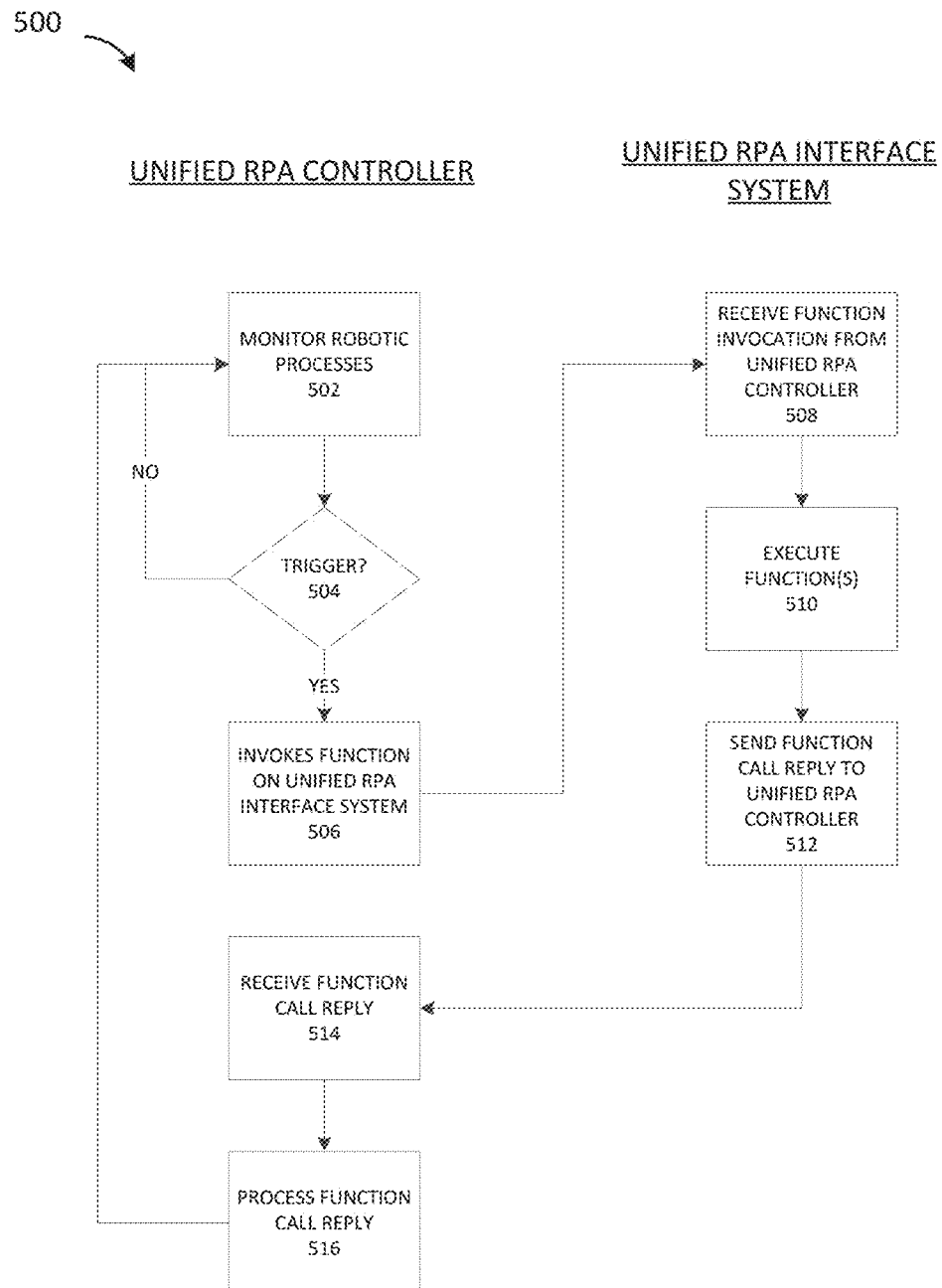
FIG. 5 illustrates an example process for monitoring robotic processes.

FIG. 5 illustrates an example process 500 for monitoring robotic processes, with respect to FIG. 1. It should be appreciated that, although the process 500 is described as being performed with respect to a single robotic process, in various embodiments, the process 500 can be repeated, or performed in parallel, for a plurality of robotic processes within an RPA platform and/or a plurality of RPA platforms. It should be further appreciated that, although the process 500 is being described with respect to a single trigger, in various embodiments, the process 500 can be repeated, or performed in parallel, for a plurality of triggers.

At block 502, the unified RPA controller 112 monitors robotic processes on the RPA platform 106 utilizing, for example, the monitoring module 114. In some embodiments, the monitoring module 114 monitors a plurality of robotic processes spanning a plurality of heterogeneous RPA platforms. In various embodiments, the block 502 can include presenting reports and dashboards using previously obtained data about the plurality of robotic processes.

At decision block 504, the unified RPA controller 112 determines whether a function invocation, for example, on the unified RPA interface system 104, has been triggered in relation to particular robotic processes such as, for example, the robotic process 134 and/or other robotic processes. In some embodiments, the trigger can be a received request for data related to the particular robotic process, a received request to add or delete the particular robotic process, combinations of same and/or the like. In certain embodiments, the trigger can include, for example, adding or deleting robotic processes, starting, stopping, or restarting robotic processes, assigning, reassigning, or changing robotic processes, or combinations of same and the like. In various embodiments, the trigger can include information gathering requests, for example, robotic process productivity, robotic process "Active" and "Idle" statuses, robotic process workload, robotic process health, robotic process performance, robotic process efficiency, robotic process failures, and robotic process utilization. In other embodiments, triggers can include various task related instructions that can be operable to, for example, perform certain tasks relating to robotic process optimization, robotic process security enhancement, run-time workforce management, business process optimization, robotic process failover functions, robotic process governance framework management, robotic process deployment management, or combinations of same and the like.

If a trigger is detected at the decision block 504, the process 500 proceeds to block 506. If no trigger is detected at the decision block 504, the process 500 proceeds back to the block 502 to continuing monitoring some or all the robotic processes. At the block 506, responsive to the trigger, the unified RPA controller 112 invokes one or more functions on the unified RPA interface system 104 in relation to one or more robotic processes. For simplicity of description, for purposes of the remainder of the process 500, it will be assumed that the trigger is received in relation to a single robotic process, namely, the robotic process 134, and that a single function is invoked. In various embodiments, the unified RPA controller 112 can invoke a function on the unified RPA interface system 104 that corresponds to a request for data, for example, such as processing time for the robotic process 134 on the RPA platform 106.

At block 508, the unified RPA interface system 104 receives information relating to the invocation of the function requested by the unified RPA controller 112. In certain embodiments, this establishes a gateway to communicate between the unified RPA controller 112 and the RPA platform 106, where the robotic process 134 resides or is executed.

At block 510, the unified RPA interface system 104 initiates executes the function and/or functions, examples of which will be discussed in further detail below with respect to FIGS. 6 and 7. This execution typically results in a function call reply in relation to the function(s) invoked. The function call reply can homogenize returned data, for example, from the RPA platform 106, into a standard format used by the unified RPA interface system 104. In general, however, the block 510 can include managing communication with the RPA platform 106, which can include invocation of one or more platform-specific functions, to fulfill the invoked function or functions from block 506. Examples of functionality that can be included in the block 510 or result from the block 510 will be described with respect to FIGS. 6-7.

At block 512, the unified RPA interface system 104 sends a function call reply, in relation to the invoked function at the block 506, to the unified RPA controller 112. In general, the function call reply can result, for example, from the unified RPA interface system 104 executing the invoked function(s) as described with respect to block 510. At block 514, the unified RPA controller 112 receives the function call reply and proceeds to block 516.

At the block 516 the unified RPA controller 112 processes the received function call reply and then proceeds to the block 502 to continue monitoring for robotic process activity. In some embodiments, the unified RPA controller 112, at the block 516, formats the function call reply for further processing or stores the function call reply for auditing purposes in, for example, the data stores 124. In some embodiments, the unified RPA controller 112 sends the function call reply to the reporting module 122 or the dashboard 120. In various embodiments, some or all steps involved in the process 500 are logged by the logging module 118 and can be stored in the data stores 124 for auditing and/or other purposes, such as, for example, alerting a user based on a logged event.

In further embodiments, at the block 516, in response to the function call reply, the unified RPA controller 112 can invoke further function(s) on the unified RPA interface system 104. In some embodiments, the unified RPA controller 112 and the unified RPA interface system 104 are operable to allow a user, accessing the VRMS 102, to view each step in the process in real-time.

In certain embodiments, functions can include, for example, adding or deleting robotic processes, starting, stopping, or restarting robotic processes, assigning, reassigning, or changing robotic processes, or combinations of same and the like. In various embodiments, functions can include information gathering determinations, for example, robotic process productivity, robotic process "Active" and "Idle" statuses, robotic process workload, robotic process health, robotic process performance, robotic process efficiency, robotic process failures, and robotic process utilization. In other embodiments, functions can include various task related instructions that can be operable to, for example, perform certain tasks relating to robotic process optimization, robotic process security enhancement, run-time workforce management, business process optimization, robotic process failover functions, robotic process governance framework management, and robotic process deployment management.

Figure 6:
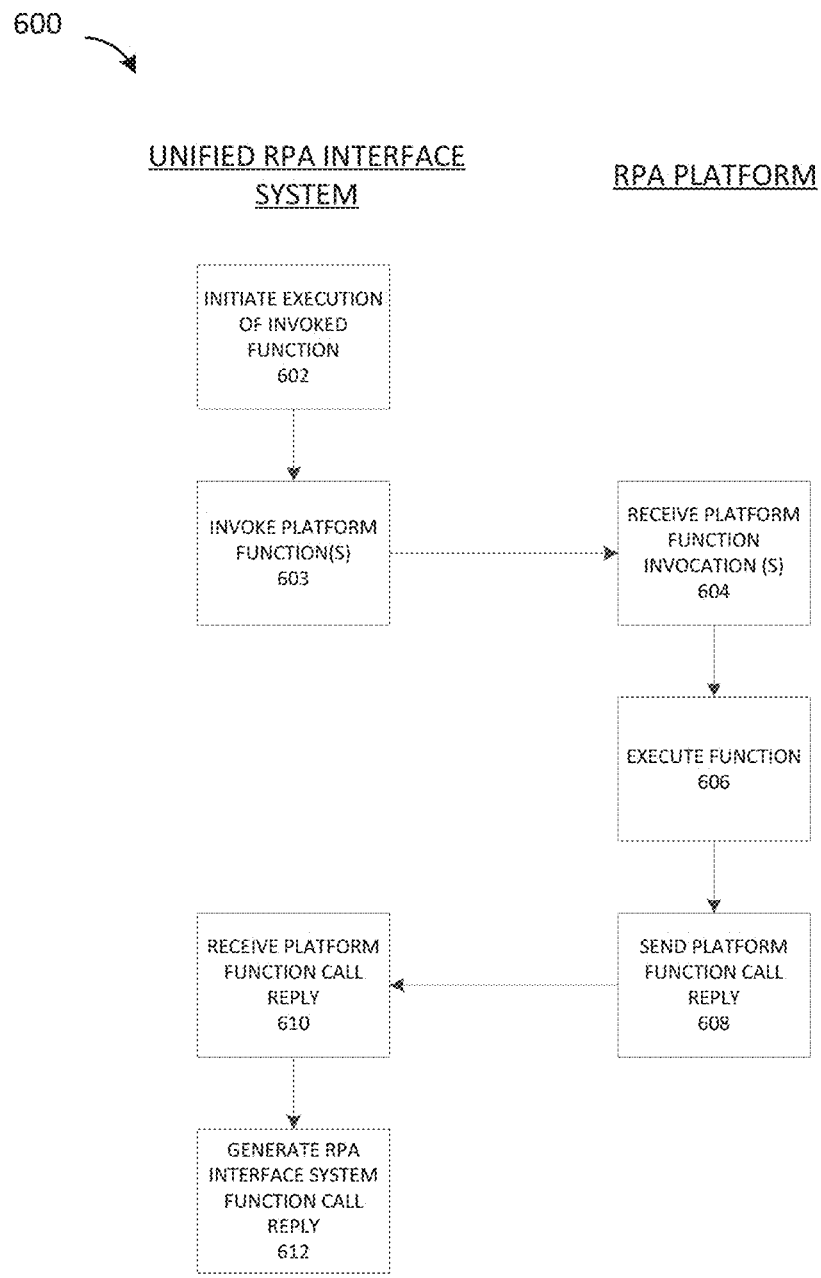
FIG. 6 illustrates an example process of a unified RPA interface operable to be utilized as a wrapper communicating with an RPA platform.

FIG. 6 illustrates an example process 600 of the unified RPA interface system 104 operable to be utilized as a wrapper communicating with the RPA platform 106. In various embodiments. FIG. 6 can be representative of the block 510 of the process 500. For illustrative purposes, the process 600 will be described relative to the system 300 of FIG. 3, in which the unified RPA interface system 304 is configured to function as the wrapper 338. It should be appreciated that, although the process 600 is described as being performed with respect to a single robotic process, in various embodiments, the process 600 can be repeated, or performed in parallel, by a plurality of robotic processes within an RPA platform and/or a plurality of RPA platforms. It should be further appreciated that, although the process 600 is being described with respect to a single function call, in various embodiments, the process 600 can be repeated, or performed in parallel, for a plurality of function calls. It should also be appreciated that, because the wrapper 338 illustrates a logical representation of components wrapped by the unified RPA interface system 304, the wrapper 338 and the unified RPA interface system 304 can be used interchangeably due to the logical representation presented in the example process 600 illustrated below. As such, operability of the wrapper 338 and the unified RPA interface system 304, in some embodiments, can be the same.

At block 602, the unified RPA interface system 304 initiates execution of an invoked function, for example, the function 340 or the function 346. The invoked function can correspond, for example, to a function invocation that is received as described relative to the block 508 of FIG. 5. At block 603, the unified RPA interface system 304, during the execution of the invoked function, invokes, or calls, a function of the API 336 such as, for example, the function 342 or the function 346. In some embodiments, the unified RPA interface system 304, in its role as the wrapper 338, can translate a particular function call (e.g., a call to the function 340 or 344) to a call to a corresponding function within the RPA platform 306 (e.g., the function 342 or 346), thereby allowing for an interface that is operable to interface with a plurality of RPA platforms without specific customization of each RPA platform of the plurality of RPA platforms. In these embodiments, the function 342 or the function 346, for example, can represent the function on the RPA platform 306 which corresponds to the invoked function.

At block 604, the RPA platform 306, via the API 336, receives the function invocation from the unified RPA interface system 304. At block 606, the RPA platform 306, via the API 336, executes the function invoked at block 603, thereby generating a reply (or function call reply). In some embodiments, the reply (or function call reply) can be data generated by the invoked function, another function, a process, a separate function that can be invoked on various components, combinations of same and the like. At block 608, the API 336 of the RPA platform 306 sends, or returns, the reply to the unified RPA interface system 304.

At block 610, the unified RPA interface system 304 receives the reply from the RPA platform 306. At block 612, the unified RPA interface system 304 generates a function call reply, responsive to the original function invocation by the unified RPA controller 312, for sending to the unified RPA controller 312. In some embodiments, the generation at the block 612 can homogenize returned data to a standard format, thereby allowing for compatibility of data flow with a plurality of RPA platforms that would send reply information in various heterogeneous data formats. In various embodiments, at the block 612, the unified RPA controller 312 can aggregate and or classify call replies for each reply received. In some cases, the function recall reply generated at block 612 can be information or data returned by the function originally executed at the block 602.

In various embodiments, the unified RPA interface system 304, in its role as the wrapper 338, can wrap a plurality of robotic processes and send the function call invoked by the unified RPA controller 312 to each robotic process of the plurality of robotic processes. In some embodiments, the process 600 allows the unified RPA controller 312 to send and receive information without directly interacting with the RPA platform 306, thereby allowing for implementation of the process 600 in existing RPA systems, for example, the RPA platform 306, without further modification to the existing RPA systems.

In certain embodiments, functions can include, for example, adding or deleting robotic processes, starting, stopping, or restarting robotic processes, assigning, reassigning, or changing robotic processes, or combinations of same and the like. In various embodiments, functions can include information gathering determinations, for example, robotic process productivity, robotic process "Active" and "Idle" statuses, robotic process workload, robotic process health, robotic process performance, robotic process efficiency, robotic process failures, and robotic process utilization. In other embodiments, functions can include various task related instructions that can be operable to, for example, perform certain tasks relating to robotic process optimization, robotic process security enhancement, run-time workforce management, business process optimization, robotic process failover functions, robotic process governance framework management, and robotic process deployment management.

Figure 7:
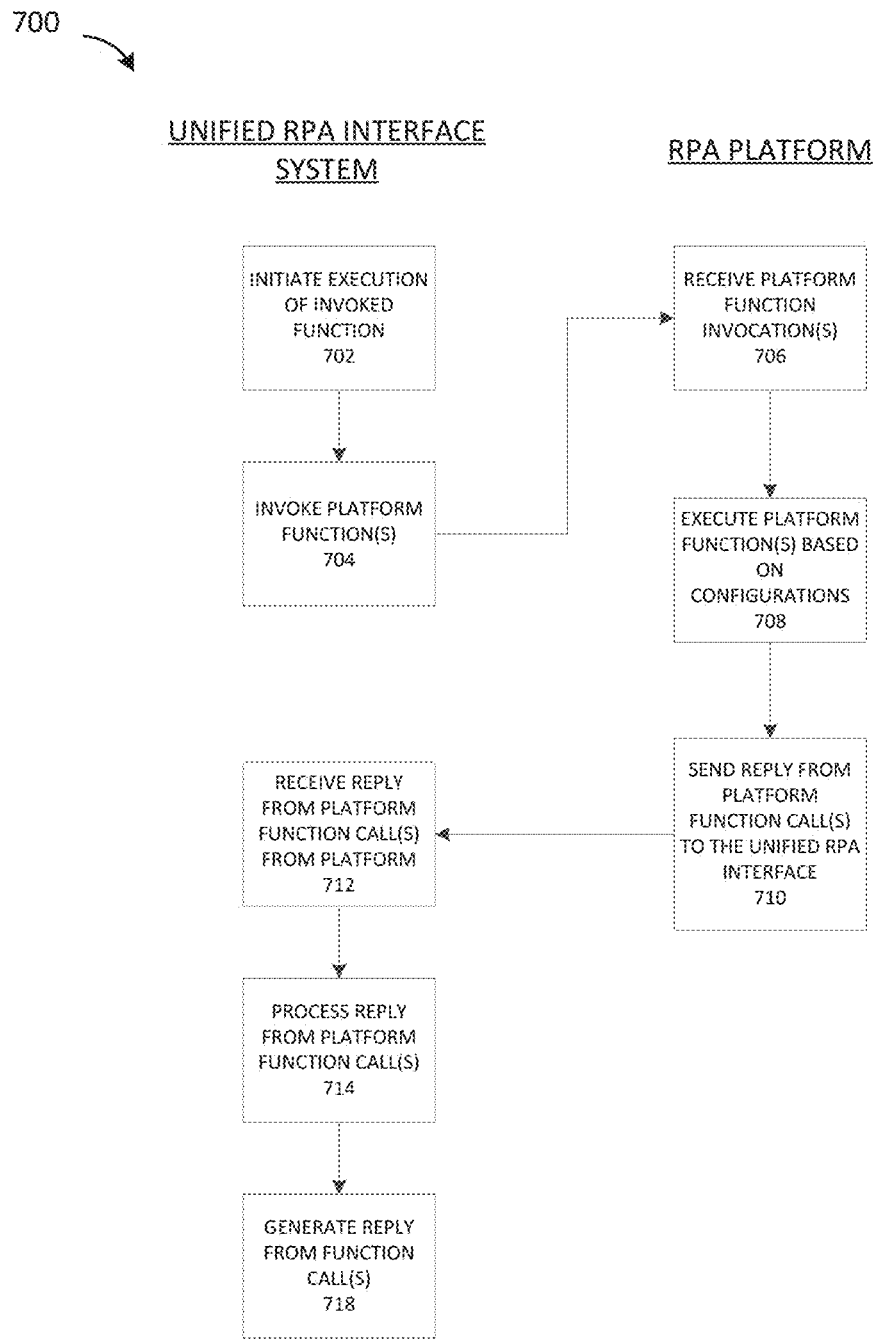
FIG. 7 illustrates an example process of a unified RPA interface operable to be utilized as a global adapter communicating with an RPA platform.

FIG. 7 illustrates an example process 700 of the unified RPA interface system 104 operable to be utilized as a global adapter communicating with the RPA platform 106. In various embodiments. FIG. 7 can be representative of the block 510 of the process 500. For illustrative purposes, the process 700 will be described relative to the system 400 of FIG. 4, in which the unified RPA interface system 404 is configured with the global adapter 438. It should be appreciated that, although the process 700 is described as being performed with respect to a single robotic process, in various embodiments, the process 700 can be repeated, or performed in parallel, for a plurality of robotic processes within an RPA platform and/or a plurality of RPA platforms. It should be further appreciated that, although the process 700 is being described with respect to a single function call, in various embodiments, the process 700 can be repeated, or performed in parallel, for a plurality of function calls.

At block 702, the unified RPA interface system 404 initiates execution of an invoked function, for example, the function 440 or the function 446 of the global adapter 438. The invoked function can correspond, for example, to a function invocation that is received as described relative to the block 508 of FIG. 5. At block 704, the unified RPA interface system 404, during the execution of the invoked function, invokes one or more platform function(s) on the RPA platform 406. In some embodiments, the block 704 can include executing a sequence of functions, for example, the function 442 and the function 444.

At block 706, the RPA platform 406, via the API 436, receives each function invocation resulting from the block 704. At block 708, the RPA platform 406, via the API 436, can execute each function invoked via the blocks 704-706 according to the configurations 428, thereby generating a reply (or function call reply) responsive to each such invocation. For example, the RPA platform 406, via the API 436, can execute the function 442 and/or the function 444. As described previously with respect to FIG. 4, the configurations 428 can include settings or other data that alter, at least in part, the behavior or operation of the robotic process 434 and/or the API 436, so that the API 436 provides appropriate data. In addition, or alternatively, the configurations 428 can identify specific functions that need to be called by the RPA platform 406, provide instructions on how to execute specific functions, modify or indicate calculations and processing that need to be completed in response to specific function requests, or combinations of same and the like. In some embodiments, the reply (or function call reply) for each invocation can be data generated by the invoked function, another function, a process, a separate function that can be invoked on various components, combinations of same and the like.

At block 710, the RPA platform 406 sends each function call reply resulting from the block 708 to the unified RPA interface system 404. At block 712, the unified RPA interface system 404 receives each reply from the platform function call(s) from the RPA platform 406. In some embodiments, this can be a single reply relative to the platform function call(s) or a plurality of replies relative to the platform function call(s). In some embodiments, for each platform function call, the unified RPA interface system 404 would receive a separate platform function call reply.

At block 714, the unified RPA interface system 404 processes the reply from the platform function call(s). In some embodiments, the processing can be relative to programming contained, for example, in the invoked function for which execution was initiated at the block 702. In some embodiments, the unified RPA interface system 404 can process the reply from the platform function call(s) by aggregating and or classifying multiple replies relative to each platform function call reply. For example, as described above relative to FIG. 4, the global adapter 438 can produce a value for processing time that results from manipulating multiple values from the API 436. At block 718, the unified RPA interface system 404 generates a function call reply (or replies) to be sent to the unified RPA controller 412. In some embodiments, the reply (or function call reply) can be data generated by the invoked function, another function, a process, a separate function that can be invoked on various components, combinations of same and the like. In some embodiments, the generation at the block 718 can homogenize returned data to a standard format, thereby allowing for compatibility of data flow with a plurality of RPA platforms that would send reply information in various heterogeneous data formats.

Figure 8:
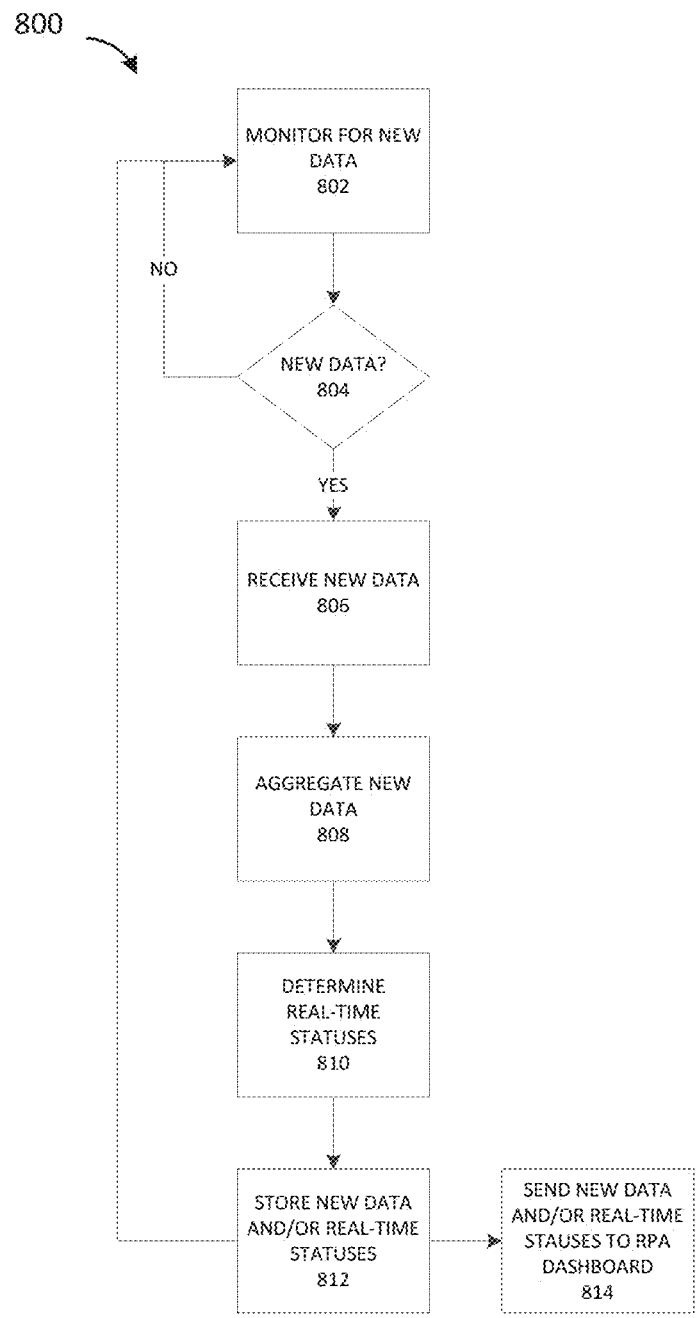
FIG. 8 illustrates an example process for monitoring for new data on the virtual resource management system.

FIG. 8 illustrates an example process 800 for monitoring for new data on the virtual resource management system 100. It should be appreciated that, although the process 800 is described as being performed with respect to a single data set, in various embodiments, the process 800 can be repeated, or performed in parallel, for a plurality of data sets from a plurality of RPA platforms, a plurality of virtual agent platforms, and a plurality of workforce management platforms. While the process 800 is described with respect to the monitoring module 114, the process 800 can be performed by any component within the VRMS 102, for example, the unified RPA controller 112, the control module 116, the logging module 118, and the reporting module 122.

At block 802, the monitoring module 114 monitors for new data on the virtual resource management system 100. The new data can result, for example, from processes similar to the processes 500, 600 and 700 of FIGS. 5, 6 and 7, respectively. In some embodiments, the unified RPA controller 112 can provide indication to the monitoring module 114 that new data is available from, for example, the RPA platform 106. In some embodiments, the monitoring module 114 monitors some or all information sent and received by the RPA platform 106, the virtual agent platform 138, the workforce management platform 140, and the client 108. In some embodiments, the RPA platform 106 can be a plurality of RPA platforms being monitored by the monitoring module 114 or the unified RPA controller 112. In certain embodiments, the unified RPA controller 112 can monitor data from the RPA platform 106 and communicate this information to the monitoring module 114. In some embodiments, the monitoring module 114 is operable to monitor the RPA platform 106. In various embodiments, the monitoring module 114 reads logs in, for example, the data stores 124, to identify new data. In various embodiments, the logging module 118 can log data from the RPA platform 106, the virtual agent platform 138, the workforce management platform 140, the client 108, and the unified RPA controller 112. In some embodiments, the monitoring at the block 802 can be a combination of the process 600 and the process 700 working in conjunction with the monitoring module 114, such that the monitoring module 114 identifies non-RPA platform activity, while the process 600 and the process 700 monitor for RPA platform activity, for example, function calls and function call replies.

At decision block 804, the monitoring module 114 determines if new data has been detected. If no new data has been detected, the process 800 proceeds back to the block 802 to monitor for new data. If at the decision block 804, the monitoring module 114 identifies new data, the process 800 proceeds to block 806. In some embodiments, new data can be uploaded by the client 108 from various data exports to be included in the virtual resource management system 100, for example, when integrating an existing platform into the virtual resource management system 100, the data from the existing platform can be added via the client 108. In some embodiments, the new data can be homogeneous or heterogeneous with respect to current data or combinations of new data.

At the block 806, the monitoring module 114 receives the new data. In some embodiments, the monitoring module 114 can receive data in real-time as it is being processed by the RPA platform 106, the virtual agent platform 138, the workforce management platform 140, the client 108, the unified RPA controller 112, or any combination thereof. In some embodiments, the monitoring module 114 can receive new data from the logging module 118 that is monitoring the RPA platform 106, the virtual agent platform 138, the workforce management platform 140, the client 108, the unified RPA controller 112, or any combination thereof. In certain embodiments, the monitoring module 114 can receive the new data from the data stores 124. In some embodiments, the new data can be homogeneous or heterogeneous with respect to various types of resources managed by various RPA platforms, various virtual agent platforms, and various workforce management platforms.

At block 808, the new data is aggregated. In some embodiments, the new data is aggregated as a result of multiple new data sets with respect to multiple resources, potentially of multiple resource types, being received. In some embodiments, the data can be aggregated with existing data or aggregated with multiple sources of incoming new data. In further embodiments, the new data can be aggregated based on receiving both RPA platform data and other resource data (e.g., related to human resources and/or virtual agents) at the block 806. In some embodiments, at the block 808, after new data is received, it can be stored in the data stores 124 while the monitoring module 114 aggregates the new data with existing data. In some embodiments, the monitoring module 114 aggregates data that was received from the RPA platform 106, the virtual agent platform 138, the workforce management platform 140, the client 108, and the unified RPA controller 112, or any combinations thereof. In essence, at the block 808, some or all data from each of the plurality of platforms within the virtual resource management system 100 can be aggregated to create a unified data set, from resources of the same or different type (e.g., robotic processes, virtual agents, and/or human resources), that can be stored in the data stores 124. In some embodiments, the data that is aggregated can originate, for example, from each RPA platform of the plurality of RPA platforms, each virtual agent platform of the plurality of virtual agent platforms, each workforce management platform of the plurality of workforce management platforms, and each client from the plurality of clients, combinations of same and/or the like.

At block 810, the monitoring module 114 can determine real-time statuses of resources, such as robotic processes, virtual agents and human resources, for example, by classifying the homogeneous data. In various embodiments, the real-time statuses, or classifications, can include, but are not limited to, platform type, activity type, process time, idle time, active time, deployment status, productivity. "Active" and "Idle" statuses, workload, robotic process health, performance, efficiency, failure, utilization, latency, logon time, logoff time, average productivity, task progress, number of tasks complete, location, current task, previous tasks, and combinations of same and the like. In various embodiments, the classification can include information about the workforce, for example, the classification can include a category for robotic processes, virtual agents, and human resources. In various embodiments, classifications can be identified by the reporting module 122 or the logging module 118. In some embodiments, the monitoring module 114 utilized the reporting module 122, the logging module 118, and/or the unified RPA controller 112 to categorize the homogeneous data.

At block 812, the monitoring module stores the new data in, for example, the data stores 124. In some embodiments, the new data is already stored in the data stores 124, for example, by the logging module 118. In various embodiments, the unified RPA controller 112, the control module 116, the logging module 118, and/or the reporting module 122 can store the data in, for example, the data stores 124. From the block 812, the process 800 can return to the block 802 and/or proceed to block 814, optionally in parallel. Upon returning to the block 802, monitoring can occur as described previously. In addition, or alternatively, at the block 814, the reporting module 122 can compile and send the new data to the dashboard 120. In some embodiments, the dashboard 120 is updated at specific time intervals, in real-time, or upon request. In some embodiments, the dashboard 120 is updated in a continuous manner in which the dashboard 120 is updated for some or all new data received. In some embodiments, the new data can invoke a trigger within the monitoring module 114 within VRMS 102 that can alert a user based on an event detected in the new data.

Figure 9:
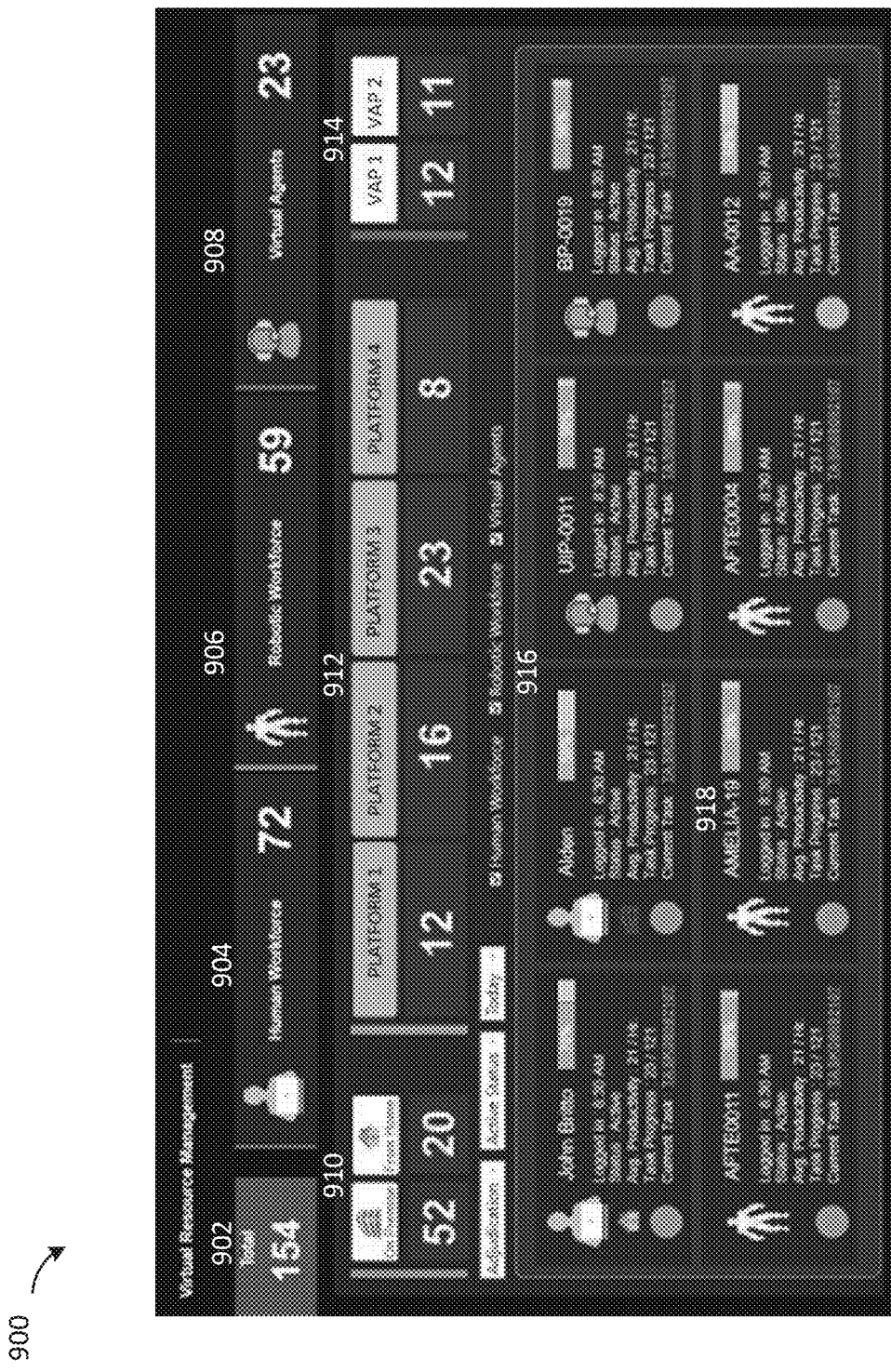
FIG. 9 illustrates an example dashboard configuration.

FIG. 9 illustrates an example dashboard configuration 900. In certain embodiments, the dashboard configuration 900 can be representative of a GUI interface provided by the dashboard 120, and can be an accumulation of some or all data generated by the unified RPA controller 112, the monitoring module 114, the control module 116, the logging module 118, and the reporting module 122. In certain embodiments, the dashboard configuration 900 can display some or all relevant information pertaining to the RPA platform 106, the virtual agent platform 138, and the workforce management platform 140. In various embodiments, the RPA platform 106 is one of a plurality of RPA platforms, the virtual agent platform 138 is one of a plurality of virtual agent platforms, and the workforce management platform 140 is one of a plurality of workforce management platforms. In some embodiments, the data displayed on the dashboard configuration 900 is a result of data obtained via the process 500, the process 600, the process 700, the process 800, or any combination thereof.

In some embodiments, the dashboard configuration 900 can display total resources 902 on the virtual resource management system 100. In certain embodiments, the total resources 902 can be broken down into human workforce 904, robotic workforce 906, and virtual agents 908. In various embodiments, the human workforce 904 can show location 910 of each individual of the human workforce 904. In some embodiments, the location 910 can be categorized, for example, as "On Premise" or "From Home." In various embodiments, information regarding the human workforce 904 can come from, for example, the workforce management platform 140 and a plurality of other workforce management platforms. In various embodiments, the robotic workforce 906 can be categorized by various RPA platforms 912. In certain embodiments, the various RPA platforms 912 can be representative of, for example, the RPA platform 106 and a plurality of other RPA platforms.

In some embodiments, the virtual agents 908 can be categorized by various virtual agent platforms 914. In various embodiments, the various virtual agent platforms 914 can be representative of, for example, the virtual agent platform 138 and a plurality of other virtual agent platforms. In some embodiments, some or all the information from the human workforce 904, the robotic workforce 906, and the virtual agents 908 can be aggregated, for example, via the process 800, and displayed in a summary 916. In certain embodiments, the summary 916 is operable to display information regarding, for example, platform type, activity type, process time, idle time, active time, deployment status, productivity, "Active" and "Idle" statuses, workload, robotic process health, performance, efficiency, failure, utilization, latency, logon time, logoff time, average productivity, task progress, number of tasks complete, location, current task, previous tasks, and combinations of same and the like.

In some embodiments, the summary 916 allows a user to drill-down by accessing a particular selection from the summary 916. For example, the user can select the robotic process 918 and can be prompted to view further information, send function requests to the robotic process 918, start or stop the robotic process 918, combinations of same and the like. In certain embodiments, the user can send or receive any function requests described above with respect to the control module 116, the reporting module 122, and the unified RPA controller 112.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a resource monitoring system:
monitoring, in real-time, a plurality of hybrid resources comprising a first robotic process resident on a first robotic process automation (RPA) platform, a second robotic process resident on a second RPA platform, a plurality of virtual agents resident on at least one virtual agent platform, and a plurality of human resources managed by at least one workforce management platform, wherein the plurality of virtual agents each comprise a program that provides an automated service, and wherein the first RPA platform, the second RPA platform and the at least one workforce management platform provide data in heterogeneous data formats via heterogeneous interfaces;
receiving a trigger responsive to the monitoring;
responsive to the trigger, invoking at least one function on a unified interface, wherein the unified interface establishes a gateway to the first RPA platform and the second RPA platform and communicates with the heterogeneous interfaces of the first RPA platform and the second RPA platform in execution of the at least one function, and wherein the unified interface homogenizes the heterogeneous data formats of the first RPA platform and the second RPA platform;
receiving at least one function call reply from the unified interface responsive to the invoking, the at least one function call reply comprising homogeneous robotic-process data related to the first robotic process and the second robotic process;
receiving, from the at least one workforce management platform, human-resource data related to the plurality of human resources;
receiving, from the at least one virtual agent platform, virtual-agent data related to the plurality of virtual agents;
creating a unified data set from at least the homogeneous robotic-process data, the human-resource data and the virtual-agent data;
determining real-time statuses of the first robotic process, the second robotic process, each of the plurality of human resources and each of the plurality of virtual agents using the unified data set; and
updating a real-time dashboard with information related to the real-time statuses of the first robotic process, the second robotic process the plurality of human resources, and the plurality of virtual agents.

2. The method of claim 1, comprising:
identifying a plurality of new data corresponding to the first robotic process and the second robotic process;
aggregating the plurality of new data;
wherein the creating the unified data set is based, at least in part, on the plurality of new data; and
wherein the determining real-time statuses comprises classifying at least a portion of the unified data set.

3. The method of claim 2, comprising alerting a user that at least one event has occurred based, at least in part, on the at least one event being detected in the unified data set.

4. The method of claim 2, comprising displaying at least a portion of the unified data set on a graphical user interface.

5. The method of claim 1 comprising, at the unified interface:
receiving the invocation of the at least one function;
responsive to the receiving, invoking a platform function on at least one of the first RPA platform and the second RPA platform; and
receiving a platform function call reply responsive to the invocation of the platform function;
generating the at least one function call reply; and
sending the at least one function call reply to the resource monitoring system.

6. The method of claim 5, wherein the invoked platform function is a translation of the invoked at least one function.

7. The method of claim 5, wherein the first RPA platform executes the invoked platform function based on configurations, stored on the first RPA platform, that customize behavior of the platform function for the unified interface.

8. The method of claim 1 comprising, at the unified interface:
receiving the invocation of the at least one function;
responsive to the receiving:
invoking a first platform function on the first RPA platform; and
invoking a second platform function on the second RPA platform;
receiving a first platform function call reply responsive to the invocation of the first platform function;
receiving a second platform function call reply responsive to the invocation of the second platform function; and
sending the at least one function call reply to the resource monitoring system.

9. The method of claim 1, comprising, at the unified interface:
   receiving the invocation of the at least one function;
   responsive to the receiving, communicating with at least one of the first robotic process and the second robotic process;
   generating the at least one function call reply based, at least in part, on the communicating; and
   sending the at least one function call reply to the resource monitoring system.

10. A system comprising a processor and memory, wherein the processor and memory in combination are operable to implement a method comprising:
   monitoring, in real-time, a plurality of hybrid resources comprising a first robotic process resident on a first robotic process automation (RPA) platform, a second robotic process resident on a second RPA platform, a plurality of virtual agents resident on at least one virtual agent platform, and a plurality of human resources managed by at least one workforce management platform, wherein the plurality of virtual agents each comprise a program that provides an automated service, and wherein the first RPA platform, the second RPA platform and the at least one workforce management platform provide data in heterogeneous data formats via heterogeneous interfaces;
   receiving a trigger responsive to the monitoring;
   responsive to the trigger, invoking at least one function on a unified interface, wherein the unified interface establishes a gateway to the first RPA platform and the second RPA platform and communicates with the heterogeneous interfaces of the first RPA platform and the second RPA platform in execution of the at least one function, and wherein the unified interface homogenizes the heterogeneous data formats of the first RPA platform and the second RPA platform;
   receiving at least one function call reply from the unified interface responsive to the invoking, the at least one function call reply comprising homogeneous robotic-process data related to the first robotic process and the second robotic process;
   receiving, from the at least one workforce management platform, human-resource data related to the plurality of human resources;
   receiving, from the at least one virtual agent platform, virtual-agent data related to the plurality of virtual agents;
   creating a unified data set from at least the homogeneous robotic-process data, the human-resource data and the virtual-agent data;
   determining real-time statuses of the first robotic process, the second robotic process each of the plurality of human resources and each of the plurality of virtual agents using the unified data set; and
   updating a real-time dashboard with information related to the real-time statuses of the first robotic process, the second robotic process the plurality of human resources, and the plurality of virtual agents.

11. The system of claim 10, the method comprising:
   identifying a plurality of new data corresponding to the first robotic process and the second robotic process;
   aggregating the plurality of new data;
   wherein the creating the unified data set is based, at least in part, on the plurality of new data; and
   wherein the determining real-time statuses comprises classifying at least a portion of the unified data set.

12. The system of claim 11, the method comprising alerting a user that at least one event has occurred based, at least in part, on the at least one event being detected in the unified data set.

13. The system of claim 10, the method comprising, at the unified interface:
   receiving the invocation of the at least one function;
   responsive to the receiving, invoking a platform function on at least one of the first RPA platform and the second RPA platform; and
   receiving a platform function call reply responsive to the invocation of the platform function;
   generating the at least one function call reply; and
   sending the at least one function call reply to a resource monitoring system.

14. The system of claim 13, wherein the invoked platform function is a translation of the invoked at least one function.

15. The system of claim 13, wherein the first RPA platform executes the invoked platform function based on configurations, stored on the first RPA platform, that customize behavior of the platform function for the unified interface.

16. The system of claim 10, the method comprising, at the unified interface:
   receiving the invocation of the at least one function;
   responsive to the receiving:
      invoking a first platform function on the first RPA platform; and
      invoking a second platform function on the second RPA platform;
   receiving a first platform function call reply responsive to the invocation of the first platform function;
   receiving a second platform function call reply responsive to the invocation of the second platform function; and
   sending the at least one function call reply to a resource monitoring system.

17. The system of claim 10, the method comprising, at the unified interface:
   receiving the invocation of the at least one function;
   responsive to the receiving, communicating with at least one of the first robotic process and the second robotic process;
   generating the at least one function call reply based, at least in part, on the communicating; and
   sending the at least one function call reply to a resource monitoring system.

18. A computer-program product comprising a non-transitory computer-usable medium having computer-readable program code embodied therein, the computer-readable program code adapted to be executed to implement a method comprising:
   monitoring, in real-time, a plurality of hybrid resources comprising a first robotic process resident on a first robotic process automation (RPA) platform, a second robotic process resident on a second RPA platform, a plurality of virtual agents resident on at least one virtual agent platform, and a plurality of human resources managed by at least one workforce management platform, wherein the plurality of virtual agents each comprise a program that provides an automated service, and wherein the first RPA platform, the second RPA platform and the at least one workforce management platform provide data in heterogeneous data formats via heterogeneous interfaces;
   receiving a trigger responsive to the monitoring;
   responsive to the trigger, invoking at least one function on a unified interface, wherein the unified interface establishes a gateway to the first RPA platform and the second RPA platform and communicates with the heterogeneous interfaces of the first RPA platform and the second RPA platform in execution of the at least one function, and wherein the unified interface homogenizes the heterogeneous data formats of the first RPA platform and the second RPA platform;

receiving at least one function call reply from the unified interface responsive to the invoking, the at least one function call reply comprising homogeneous robotic-process data related to the first robotic process and the second robotic process;

receiving, from the at least one workforce management platform, human-resource data related to the plurality of human resources;

receiving, from the at least one virtual agent platform, virtual-agent data related to the plurality of virtual agents;

creating a unified data set from at least the homogeneous robotic-process data, the human-resource data and the virtual-agent data;

determining real-time statuses of the first robotic process, the second robotic process each of the plurality of human resources and each of the plurality of virtual agents using the unified data set; and updating a real-time dashboard with information related to the real-time statuses of the first robotic process, the second robotic process the plurality of human resources and the plurality of virtual agents.

* * * * *